(12) United States Patent
Yanagihara et al.

(10) Patent No.: US 6,316,605 B1
(45) Date of Patent: Nov. 13, 2001

(54) HYDRAZONE DYE

(75) Inventors: Naoto Yanagihara; Tatsuo Kawabuchi; Tetsunori Matsushita; Kimiatsu Nomura; Yohsuke Takeuchi; Hisao Yamada, all of Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/684,963

(22) Filed: Oct. 10, 2000

(30) Foreign Application Priority Data

Oct. 8, 1999 (JP) .................................... 11-288470

(51) Int. Cl.$^7$ ............................ C09B 26/02; C09B 56/18
(52) U.S. Cl. ......................... 534/752; 544/211; 544/220; 544/282
(58) Field of Search ............................ 534/752; 544/211, 544/220, 282

(56) References Cited

U.S. PATENT DOCUMENTS

| 4,666,526 | * | 5/1987 | Rolf et al. ............... 106/309 |
| 5,344,933 | * | 9/1994 | Mikoshiba et al. .......... 544/282 |

FOREIGN PATENT DOCUMENTS

| 11-157221 | 6/1999 | (JP) . |
| 12-26465 | 1/2000 | (JP) . |
| 12-159769 | 6/2000 | (JP) . |

* cited by examiner

*Primary Examiner*—Fiona T. Powers
(74) *Attorney, Agent, or Firm*—Sughrue, Mion, Zinn, Macpeak & Seas, PLLC

(57) ABSTRACT

A hydrazone dye is provided which forms cyan color having an excellent hue. The hydrazone dye is expressed by the following general formula (I):

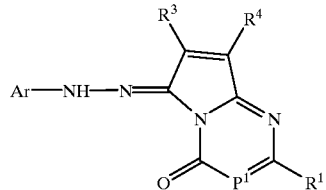

general formula (I)

$P^1$ is $CR^2$ or N wherein Ar represents an aryl group or a heterocyclic group; $R^1$ through $R^4$ each represent a hydrogen atom, a halogen, —CN, —NH$_2$, —NO$_2$, —OH, —CO$_2$H, —SO$_3$H, a quaternary ammonium group, —CO$_2$M$_{1/n}$, —SO$_3$M$_{1/n}$, an alkyl group, alkenyl group, alkynyl group, aryl group, acyl group, carbamoyl group, sulfamoyl group, alkoxycarbonyl group, aryloxycarbonyl group, acyloxy group, alkoxy group, aryloxy group, alkylthio group, arylthio group, alkylsulfonyl group, arylsulfonyl group, alkylphosphoryl group, arylphosphoryl group, or a substituted amino group; M represents a metal atom; and n represents an integer from 1 to 4.

12 Claims, No Drawings

HYDRAZONE DYE

BACKGROUND OF THE INVENTION

1. Field of the Invention

The present invention relates to a hydrazone dye having a novel structure, and relates to a dye used in recording materials for thermal transfer recording, ink jet recording and the like, and to a colorant (composition) for use in a filter or the like.

2. Description of the Related Art

Azo dyes are dyes which are used the most; they account for more than half of the dyes which are used.

There are many publications about azo dyes. Representative among them are *Color Chemistry* (Heinrich Zollinger, Weinheim, New York, Basel, Cambridge 1987), *Synthetic Dyes* (*Gosei Senryou*) (Hiroshi Horiguchi, Sankyo Shuppan KK, 1970), and the like. Details are described in the chapters on azo dyes and azo pigments.

An azo dye is generally defined as being a structure in which a carbon having an $sp^2$ hybrid orbital is bonded to each of the both ends of an azo group (—N=N—).

For example, the compound azobenzene represented by the following formula falls into the category of azo dyes.

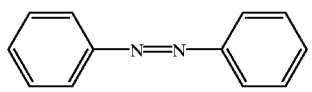

When azobenzene has a dissociated group, a tautomer is generated depending on the position of the dissociated group. For example, in an azobenzene in which —OH is substituted at the position next to the azo group, the following tautomer is generated. azo structure hydrazone structure

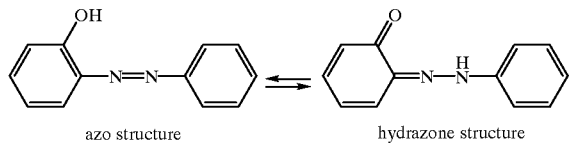

azo structure       hydrazone structure

A detailed discussion relating to tautomers of azobenzene can be und on pages 133 through 137 of the aforementioned *Color Chemistry*.

In order to improve the hue such as making the absorption of the dye sharper or the like, it is preferable to lean toward either an azo structure or a hydrazone structure. Or, structures that do not produce tautomers are preferable. However, there has still not been developed a cyan color forming azo dye resulting in a good hue.

SUMMARY OF THE INVENTION

The present invention was developed in light of the above-described circumstances, and an object thereof is to provide a hydrazone dye which forms colors in the range from magenta through cyan having excellent hues.

The following hydrazone dyes are provided in order to achieve the above-described object.

(1) A hydrazone dye comprising a compound represented by a general formula (I) as follows:

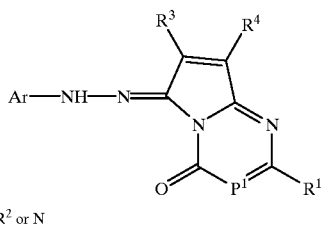

general formula (I)

$P^1$ is $CR^2$ or N wherein Ar represents an aryl group or a heterocyclic group; $R^1$ through $R^4$ each represent a hydrogen atom, a halogen, —CN, —NH$_2$, —NO$_2$, —OH, —CO$_2$H, —SO$_3$H, a quaternary ammonium group, —CO$_2$M$_{1/n}$, —SO$_3$M$_{1/n}$, an alkyl group, alkenyl group, alkynyl group, aryl group, acyl group, carbamoyl group, sulfamoyl group, alkoxycarbonyl group, aryloxycarbonyl group, acyloxy group, alkoxy group, aryloxy group, alkylthio group, arylthio group, alkylsulfonyl group, arylsulfonyl group, alkylphosphoryl group, arylphosphoryl group, or a substituted amino group; M represents a metal atom; and n represents an integer from 1 to 4.

(2) The hydrazone dye according to the above (1), wherein the group represented by Ar is represented by a general formula (II) as follows:

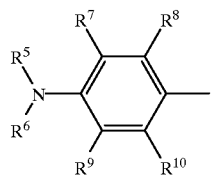

general formula (II)

wherein $R^5$ and $R^6$ each represent a hydrogen atom, an alkyl group, or an aryl group; and $R^7$ through $R^{10}$ are each respectively defined identical to that for $R^1$ through $R^4$ of general formula (I).

(3) The hydrazone dye according to claim 1, wherein the group represented by Ar is represented by a general formula (III) as follows:

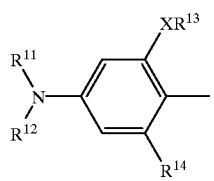

general formula (III)

wherein $R^{11}$ through $R^{13}$ represent a hydrogen atom, an alkyl group or an aryl group; $R^{14}$ represents a hydrogen atom, a halogen, an alkyl group, an alkoxy group, an aryl group or an aryloxy group; and X represents O or S.

(4) The hydrazone dye according to claim 1, wherein the group represented by Ar is represented by a general formula (IV) as follows:

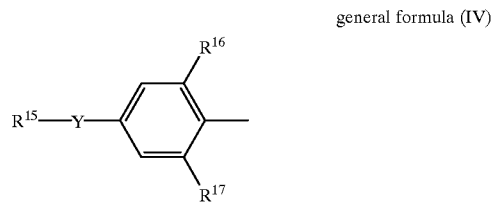

general formula (IV)

wherein $R^{15}$ is a hydrogen atom, an alkyl group or an aryl group; $R^{16}$ and $R^{17}$ represent a hydrogen atom, a halogen, an alkyl group, an alkoxy group, an aryloxy group, an alkylthio group, an arylthio group or an aryl group; and Y represents O or S.

(5) A hydrazone dye comprising a compound represented by a general formula (V) as follows:

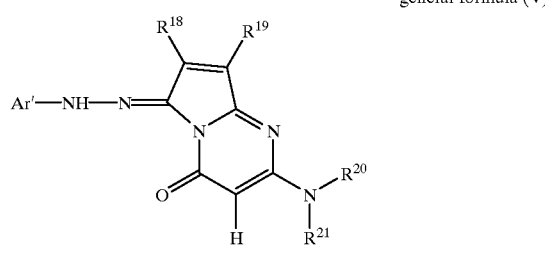

general formula (V)

wherein Ar' represents an aryl group or a heterocyclic group; $R^{18}$ and $R^{19}$ each represent a hydrogen atom, a halogen, —CN, —NH$_2$, —NO$_2$, —OH, —CO$_2$H, —SO$_3$H, a quaternary ammonium group, —CO$_2$M$_{1/n}$, —SO$_3$M$_{1/n}$, an alkyl group, alkenyl group, alkynyl group, aryl group, acyl group, carbamoyl group, sulfamoyl group, alkoxycarbonyl group, aryloxycarbonyl group, acyloxy group, alkoxy group, aryloxy group, alkylthio group, arylthio group, alkylsulfonyl group, arylsulfonyl group, alkylphosphoryl group, arylphosphoryl group, or a substituted amino group; $R^{20}$ represents an acyl group, a carbamoyl group, a sulfamoyl group, an alkoxycarbonyl group, an alkylsulfonyl group, or an arylsulfonyl group; and $R^{21}$ represents a hydrogen atom, an alkyl group, an aryl group or an acyl group.

In a preferred embodiment, the group represented by Ar' is represented by a general formula (VII) as follows:

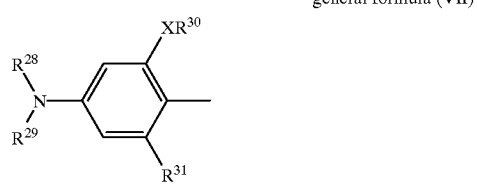

general formula (VII)

wherein $R^{28}$ through $R^{30}$ represent a hydrogen atom, an alkyl group or an aryl group; $R^{31}$ represents a hydrogen atom, a halogen, an alkyl group, an alkoxy group, an aryl group or an aryloxy group; and X represents O or S.

In another preferred embodiment, the group represented by Ar' is represented by a general formula (VIII) as follows:

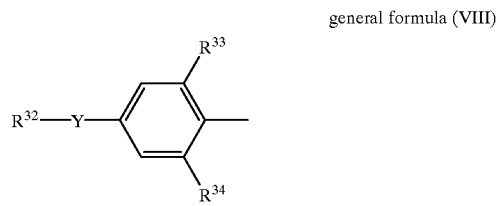

general formula (VIII)

wherein $R^{32}$ is a hydrogen atom, an alkyl group or an aryl group; $R^{33}$ and $R^{34}$ represent a hydrogen atom, a halogen, an alkyl group, an alkoxy group, an aryloxy group, an alkylthio group, an arylthio group or an aryl group; and Y represents O or S.

(6) A hydrazone dye comprising a compound represented by a general formula (IX) as follows:

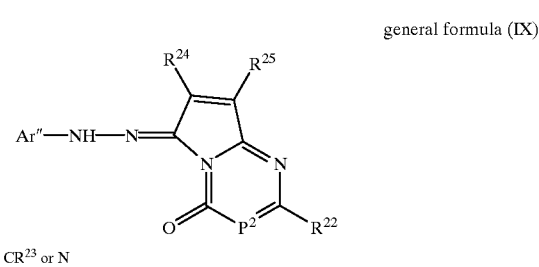

general formula (IX)

$P^2$ is $CR^{23}$ or N wherein Ar" represents an aryl group or a heterocyclic group; $R^{22}$ $R^{24}$ and $R^{25}$ each represent a hydrogen atom, a halogen, —CN, —NH$_2$, —NO$_2$, —OH, —CO$_2$H, —SO$_3$H, a quaternary ammonium group, —CO$_2$M$_{1/n}$, —SO$_3$M$_{1/n}$, an alkyl group, alkenyl group, alkynyl group, aryl group, acyl group, carbamoyl group, sulfamoyl group, alkoxycarbonyl group, aryloxycarbonyl group, acyloxy group, alkoxy group, aryloxy group, alkylthio group, arylthio group, alkylsulfonyl group, arylsulfonyl group, alkylphosphoryl group, arylphosphoryl group, or a substituted amino group; and $R^{23}$ represents an electron attracting group whose Hammett $\sigma_p$ value is 0.25 or more.

In a preferred embodiment, the group represented by Ar" is represented by a general formula (XI) as follows:

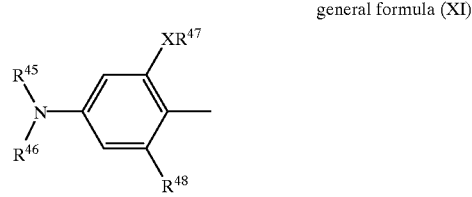

general formula (XI)

wherein $R^{45}$ trough $R^{47}$ represent a hydrogen atom, an alkyl group or an aryl group; $R^{48}$ represents a hydrogen atom, a halogen, an alkyl group, an alkoxy group, an aryl group or an aryloxy group; and X represents O or S.

In another preferred embodiment, the group represented by Ar" is represented by a general formula (XII) as follows:

general formula (XII)

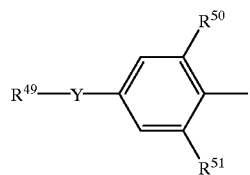

wherein $R^{49}$ is a hydrogen atom, an alkyl group or an aryl group; $R^{50}$ and $R^{51}$ represent a hydrogen atom, a halogen, an alkyl group, an alkoxy group, an aryloxy group, an alkylthio group, an arylthio group or an aryl group; and Y represents O or S.

DESCRIPTION OF THE PREFERRED EMBODIMENTS

The present invention will be described in detail hereinafter.

As described above, in order to improve the hue such as make the absorption of the dye more sharp or the like, it is preferable to lean toward either an azo structure or a hydrazone structure, or a structure which does not produce tautomers is preferable. However, the inventors of the present invention studied techniques for fixing an azo dye having a dissociated group to a hydrazone structure. As a result, the present inventors found that it is difficult for the hydrazone dye of the present invention represented by general formula (I) to isomerize into an azo structure, and thus arrived at the present invention. The hydrazone dye of the present invention results in the formation of a cyan color which has an excellent hue and whose dye absorption is sharp.

The hydrazone dye of the present invention is represented by following general formula (I).

In general formula (I), Ar represents an aryl group or a heterocyclic group; $R^1$ through $R^4$ each represent a hydrogen atom, a halogen, —CN, —NH$_2$, —NO$_2$, —OH, —CO$_2$H, —SO$_3$H, a quaternary ammonium group, —CO$_2$M$_{1/n}$, —SO$_3$M$_{1/n}$, an alkyl group, an alkenyl group, an alkynyl group, an aryl group, an acyl group, a carbamoyl group, a sulfamoyl group, an alkoxycarbonyl group, an aryloxycarbonyl group, an acyloxy group, an alkoxy group, an aryloxy group, an alkylthio group, an arylthio group, an alkylsulfonyl group, an arylsulfonyl group, an alkylsulfonyl group, an arylphosphoryl group, or a substituted amino group; M represents a metal atom; and n represents an integer from 1 to 4.

Examples of the halogen atom are fluorine atoms, chlorine atoms, and bromine atoms, and fluorine atoms and chlorine atoms are more preferable.

Ar in general formula (I) represents an aryl group or a heterocyclic group, both of which may be substituted. Examples of the aryl group include phenyl group and naphthyl group, and these may be substituted by a halogen, a cyano group, a nitro group, CO$_2$H, CO$_2$Na, CO$_2$K, SO$_3$H, SO$_3$Na, SO$_3$K, an amino group, an alkoxy group, an acylamino group, an amide group, or the like. Preferable examples of the aryl group are the following.

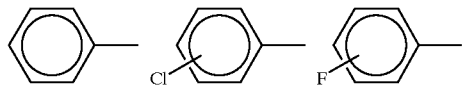

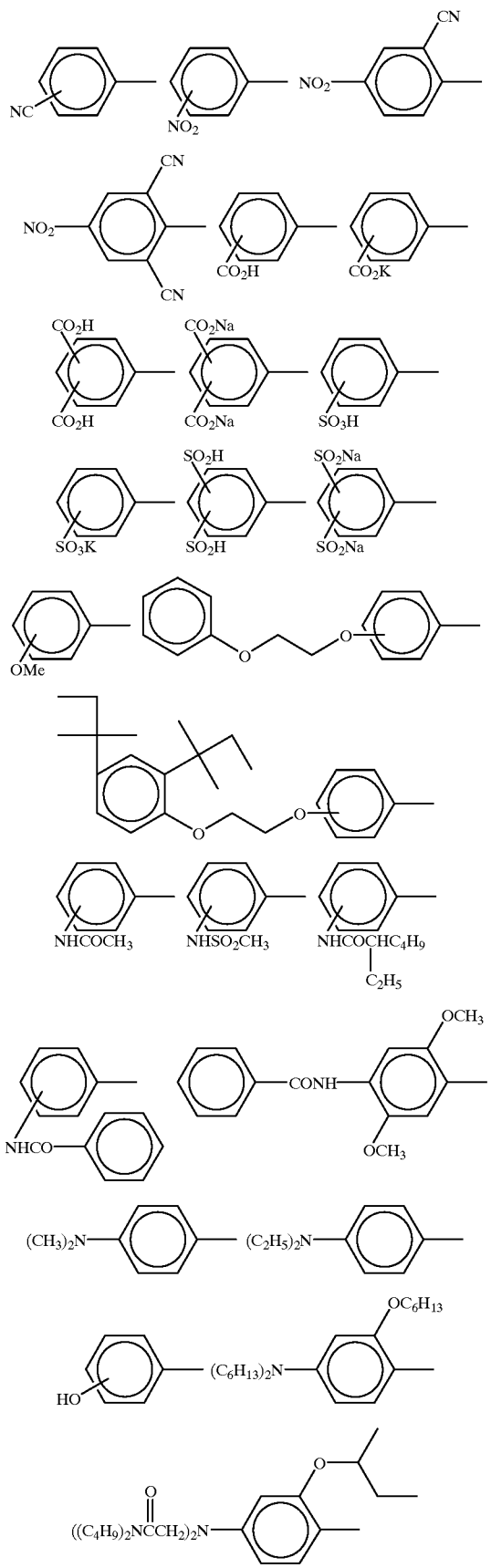

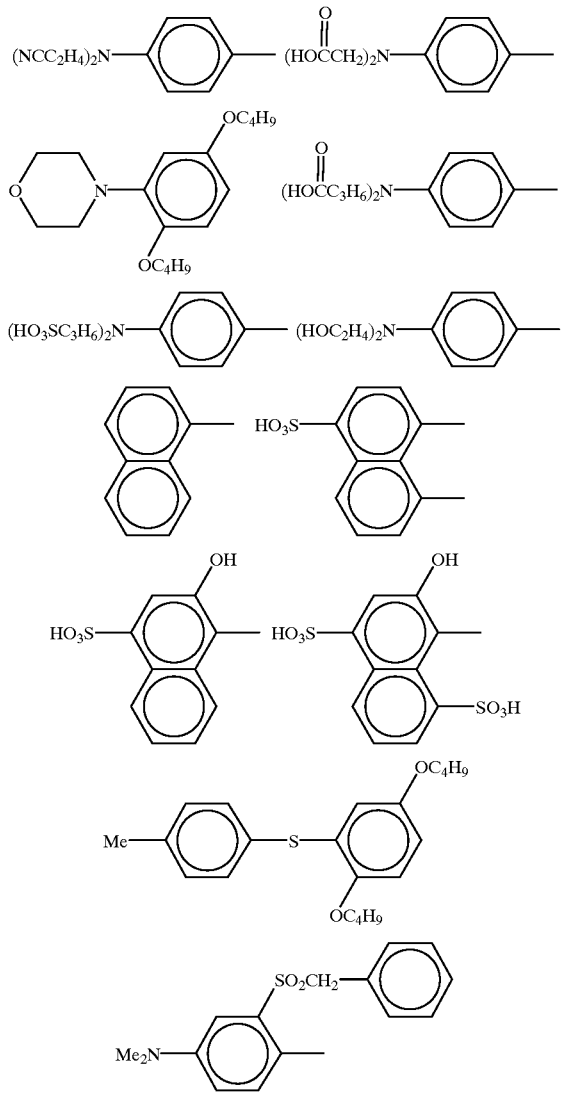

The Ar may be a bivalent group, and in this case, the hydrazone dye of the present invention may have two hydrazone rings. Preferable examples of bivalent Ar are the following.

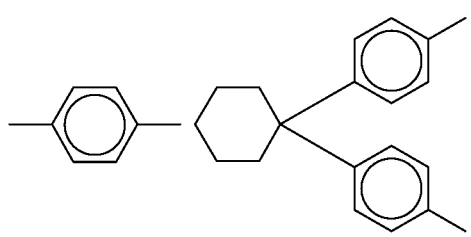

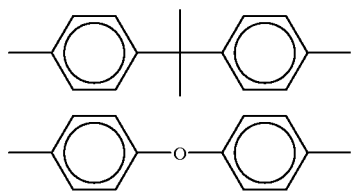

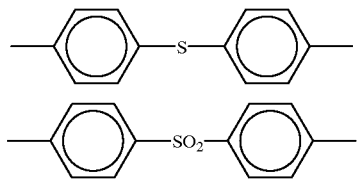

Examples of the heterocyclic group are 2-pyridyl, 3-pyridyl, 4-pyridyl, thienyl, 3-thiophenyl, 2-thiazolyl, 5-thiazolyl, benzothiazolyl, diazolyl, triazolyl, benzodiazolyl, benzooxazolyl, 2-furanyl, benzothiophenyl, and the like. The following are preferable examples of the heterocyclic group.

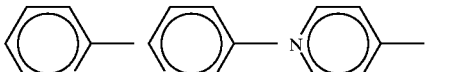
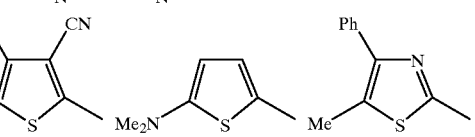
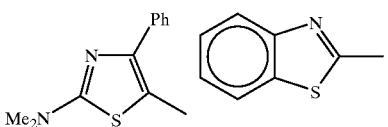
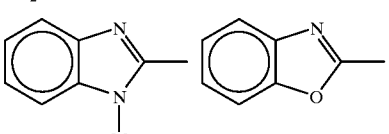
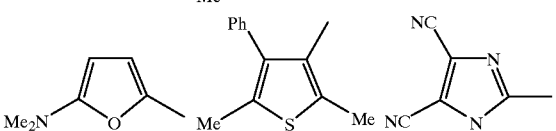
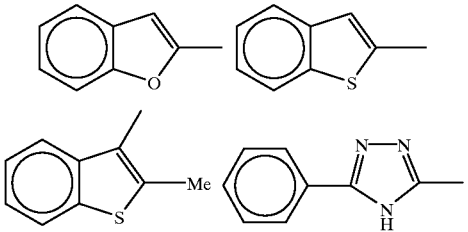
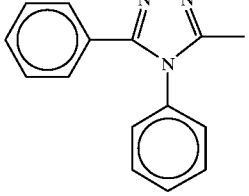

The substitutents of above $R^1$ through $R^4$ may themselves be substituted. Among the substitutents of $R^1$ through $R^4$, the aryl group may be substituted by an alkyl group, an alkoxy group, an aryloxy group, a halogen atom, a nitro group, a cyano group, a substituted carbamoyl group, a substituted sulfamoyl group, a substituted amino group, a substituted oxycarbamoyl group, a substituted oxysulfonyl group, an alkylthio group, an arylthio group, an alkylsulfonyl group, an arylsulfonyl group, an aryl group, a hydroxy group, an acyl group, an acyloxy group, a substituted sulfonyloxy group, a substituted aminocarbonyloxy group, a substituted phosphoryloxy group, —CO$_2$H, —SO$_3$H, a quaternary ammonium group, —CO$_2$M$_{1/n}$, —SO$_3$M$_{1/n}$ (wherein M and n are defined in the same way as in the previous general formula, and specific examples of the quaternary ammonium group are the same as the specific examples of the quaternary ammonium group which are substituents for R$^1$ through R$^4$ which will be described later).

The aryl group is preferably an aryl group having from 6 to 30 carbon atoms. Preferable examples include a phenyl group, 2-methylphenyl group, 2-chlorophenyl group, 2-methoxyphenyl group, 2-ethoxyphenyl group, 2-propoxyphenyl group, 2-isopropoxyphenyl group, 2-butoxyphenyl group, 2-(2-ethylhexyloxy)phenyl group, 2-octyloxyphenyl group, 2-undecyloxyphenyl group, 2-trifluoromethylphenyl group, 2-(2-ethylhexyloxy)-5-chlorophenyl group, 2,2'-hexyloxy-3,5-dichlorophenyl group, 3-(2,4-di-t-pentylphenoxyethoxy)phenyl group, 2-(dibutylaminocarbonylethoxy)phenyl group, 2,4-dichlorophenyl group, 2,5-dichlorophenyl group, 2,4,6-trimethylphenyl group, 3-chlorophenyl group, 3-nitrophenyl group, 3-cyanophenyl group, 3-trifluoromethylphenyl group, 3-methoxyphenyl group, 3-ethoxyphenyl group, 3-butoxyphenyl group, 3(2'-ethylhexyloxy)phenyl group, 3,4-dichlorophenyl group, 3,5-dichlorophenyl group, 3,4-dimethoxyphenyl group, 3,5-dibutoxyphenyl group, 3-octyloxyphenyl group, 3-(dibutylaminocarbonylmethoxy)phenyl group, 3-(di-2-ethylhexylaminocarbonylmethoxy)phenyl group, 3-dodecyloxyphenyl group, 4-chlorophenyl group, 4-cyanophenyl group, 4-nitrophenyl group, 4-trifluoromethylphenyl group, 4-methoxyphenyl group, 4-ethoxyphenyl group, 4-isopropoxyphenyl group, 4-butoxyphenyl group, 4-(2-ethylhexyloxy)phenyl group, 4-isopentyloxyphenyl group, 4-(octadecyloxy)phenyl group, 4-benzylphenyl group, 4-aminosulfonylphenyl group, 4-N-N-dibutylsulfonylphenyl group, 4-ethoxycarbonylphenyl group, 4-(2-ethylhexyloxycarbonyl)phenyl group, 4-t-octylphenyl group, 4-fluorophenyl group, 3-acetylphenyl group, 2-acetylaminophenyl group, 2,4-di-t-pentylphenyl group, 4-(2-ethylhexyloxy)carbonylphenyl group, 4-methylthiophenyl group, 4-(4-chlorophenylthio)phenyl group, as well as hydroxyphenyl group, phenylsulfonylphenyl group, phenylsulfonyloxyphenyl group, phenylcarbonyloxyphenyl group, dimethylaminocarbonyloxyphenyl group, butylcarbonyloxyphenyl group, and the like. Other examples are the groups represented by the following formulae.

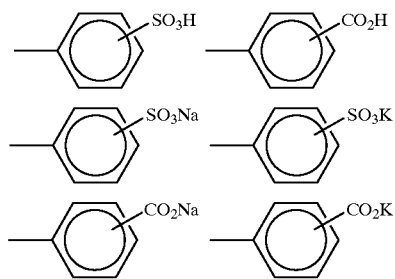

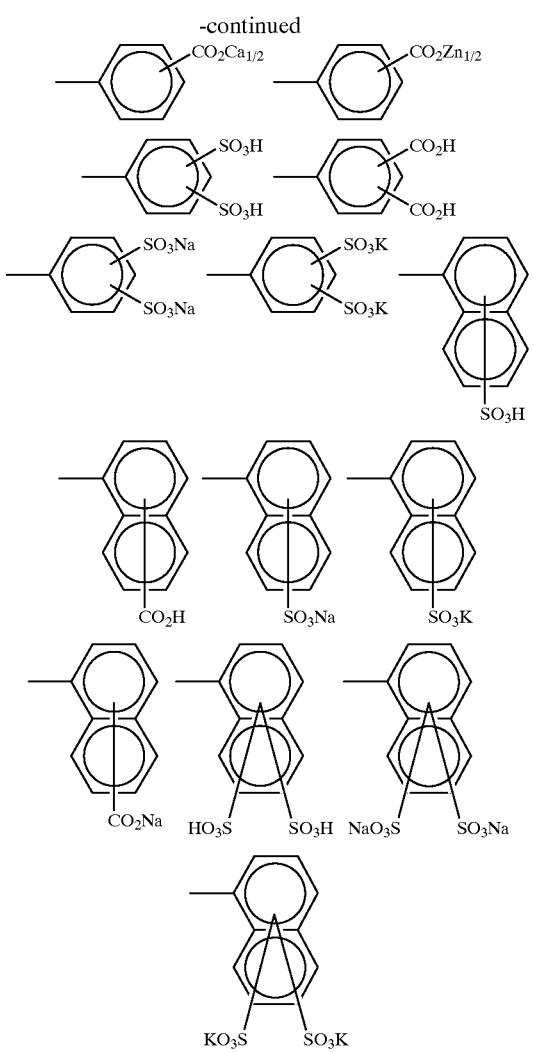

Among the substituents of R$^1$ through R$^4$, the alkyl group may be linear or branched, and may have an unsaturated bond. These alkyl groups may be substituted by an alkoxy group, aryloxy group, alkoxycarbonyl group, aryloxycarbonyl group, aryl group, hydroxy group, a halogen atom or the like. Further, the aryl group may be substituted by an alkyl group, an alkoxy group, a nitro group, a cyano group, a hydroxy group or a halogen atom, —CO$_2$H, —SO$_3$H, a quaternary ammonium group, —CO$_2$M$_{1/n}$, —SO$_3$M$_{1/n}$, (wherein the definitions of M and n are the same as for the above general formula, and specific examples of the quaternary ammonium groups are the same as the specific examples of the quaternary ammonium groups which are the substitutents for R$^1$ through R$^4$ which will be described later).

The alkyl group is preferably an alkyl group having 1 to 30 carbon atoms. Examples thereof include methyl group, trifluoromethyl group, ethyl group, butyl group, hexyl group, octyl group, 2-ethylhexyl group, decyl group, dodecyl group, octadecyl group, propyl group, isopropyl group, isobutyl group, sec-butyl group, t-butyl group, pentyl group, 1-ethylpentyl group, cyclopentyl group, cyclohexyl group, isopentyl group, heptyl group, nonyl group, undecyl group, propenyl group, heptadecenyl group, t-octyl group, ethoxycarbonylmethyl group, butoxycarbonylmethyl group, 2-ethylhexyloxycarbonylmethyl group, 1-(ethoxycarbonyl)

ethyl group, 2',4'-diisopentylphenyloxymethyl group, 2',4'-di-t-butylphenyloxymethyl group, ethoxycarbonylethyl group, 2-ethylhexyloxycarbonylethyl group, butyldecyloxycarbonylethyl group, dibutylaminocarbonylmethyl group, dibenzylaminocarbonylethyl group, ethyloxycarbonylpropyl group, 2-ethylhexyloxycarbonylpropyl group, 2,4-di-t-amylphenyloxypropyl group, 1-(2',4'-di-t-amylphenyloxy)propyl group, 2,4-di-t-butylphenyloxypropyl group, acetylaminoethyl group, N,N-dihexylaminocarbonylethyl group, 2,4-di-t-amyloxyethyloxycarbonylpropyl group, isostearyloxycarbonylpropyl, 1-(2,4-di-t-pentylphenyloxy)propyl group, 2,4-di-t-pentylphenyloxyethyloxycarbonylpropyl group, naphthyloxyethyloxycarbonylethyl group, N-methyl-N-phenylethyloxycarbonylethyl group, methane sulfonylaminopropyl group, $-(CH_2)_mCO_2H$, $-(CH_2)_mCO_2Na$, $-(CH_2)_mCO_2K$, $-(CH_2)_mSO_3H$, $-(CH_2)_mSO_3Na$, $-(CH_2)_mSO_3K$ (wherein m is an integer from 1 through 4).

Among the substituents for $R^1$ through $R^4$, as the alkenyl group, alkenyl groups having 2 to 10 carbon atoms are preferable. Examples include vinyl group, $-CH=CH-PH$ (cinnamyl group) and the like. Further, as the alkynyl group, alkynyl groups having 2 to 10 carbon atoms are preferable. Examples include ethynyl group, 2-methyl-ethynyl group, 2-phenyl-ethynyl group, and the like.

Among the substituents for $R^1$ through $R^4$, the acyl group is preferably an acyl group having from 2 to 20 carbon atoms. Examples include an acetyl group, propanoyl group, butanoyl group, hexanoyl group, octanoyl group, 2-ethylhexanoyl group, decanoyl group, dodecanoyl group, octadecanoyl group, 2-cyanopropanoyl group, 1,2-dimethylpropanoyl group, and the like. Other examples of the acyl group are the following.

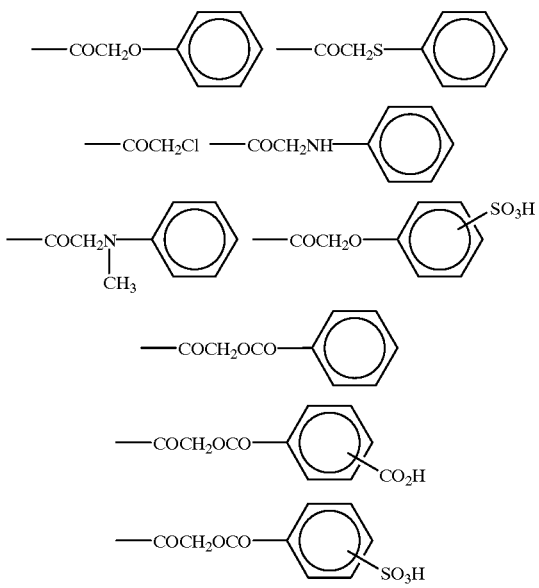

Among the substituents of $R^1$ through $R^4$, examples of the substituted carbamoyl group include carbamoyl group, N-alkylcarbamoyl group, N-arylcarbamoyl group, N,N-dialkylcarbamoyl group, N,N-diarylcarbamoyl group, N-alkyl-N-arylcarbamoyl group, or the like.

A substituted carbamoyl group having from 1 to 30 carbon atoms is preferable as the substituted carbamoyl group. Examples include N-methylcarbamoyl group, N-ethylcarbamoyl group, N-propylcarbamoyl group, N-butylcarbamoyl group, N-hexylcarbamoyl group, N-cyclohexylcarbamoyl group, N-octylcarbamoyl group, N-2-ethylhexylcarbamoyl group, N-decylcarbamoyl group, N-octadecylcarbamoyl group, N-phenylcarbamoyl group, N-2-methylphenylcarbamoyl group, N-2-chlorophenylcarbamoyl group, N-2-methoxyphenylcarbamoyl group, N-2-isopropoxyphenylcarbamoyl group, N-2-(2-ethylhexyloxy)phenylcarbamoyl group, N-3-chlorophenylcarbamoyl group, N-3-nitrophenylcarbamoyl group, N-3-cyanophenylcarbamoyl group, N-4-methoxycarbamoyl group, N4-(2'-ethylhexyloxy)phenylcarbamoyl group, N-4-cyanophenylcarbamoyl group, N-methyl-N-phenylcarbamoyl group, N,N-dimethylcarbamoyl group, N,N-dibutylcarbamoyl group, N,N-diphenylcarbamoyl group, and the like. The following are also examples of the substituted carbamoyl group.

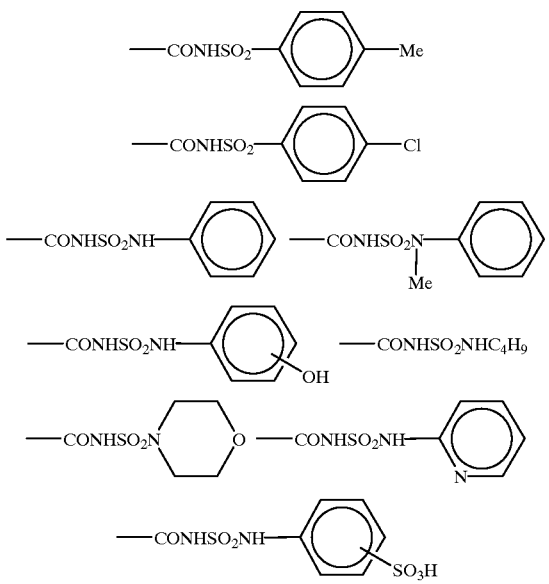

Among the substituents of $R^1$ through $R^4$, the alkoxycarbonyl group is preferably an alkoxycarbonyl group having 2 through 20 carbon atoms. Examples thereof include methoxycarbonyl group, ethoxycarbonyl group, propoxycarbonyl group, butoxycarbonyl group, hexyloxycarbonyl group, 2-ethylhexyloxycarbonyl group, octyloxycarbonyl group, decyloxycarbonyl group, octadecyloxycarbonyl group, phenyloxyethyloxycarbonyl group, phenyloxypropyloxycarbonyl group, 2,4-di-t-amylphenyloxyethylcarbonyl group, 2,6-di-t-butyl-4-methylcyclohexyloxycarbonyl group, isostearyloxycarbonyl group, $-CO_2-(CH_2)_mCO_2H$, $-CO_2-(CH_2)_mCO_2Na$, $-CO_2-(CH_2)_mCO_2K$, $-CO_2-(CH_2)_mSO_3H$, $-CO_2-(CH_2)_mSO_3Na$, $-CO_2-(CH_2)_mSO_3K$ (wherein m is an integer from 1 through 4).

Among the substituents of $R^1$ through $R^4$, aryloxycarbonyl groups having from 7 to 30 carbon atoms are preferable as the aryloxycarbonyl groups. Examples include 2-methylphenyloxycarbonyl group, 2-chlorophenyloxycarbonyl group, 2,6-dimethylphenyloxycarbonyl group, 2,4,6-trimethylphenyloxycarbonyl group, 2-methoxyphenyloxycarbonyl group, 2-butoxyphenyloxycarbonyl group, 3-cyanophenyloxycarbonyl group, 3-nitrophenyloxycarbonyl group, 2,2- ethylhexylphenyloxycarbonyl group, 3-(2-ethylhexyloxy) phenyloxycarbonyl group, 4-fluorophenyloxycarbonyl group, 4-chlorophenyloxycarbonyl group, 4-cyanophenyloxycarbonyl group, 4-butoxyphenyloxycarbonyl group, and the like. The following are further examples of aryloxycarbonyl groups.

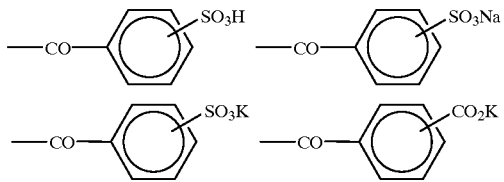

Among the substituents of $R^1$ through $R^4$, the acyloxy group is preferably an acyloxy group having from 2 to 20 carbon atoms. Examples thereof include acetyloxy group, propanoyloxy group, butanoyloxy group, pentanoyloxy group, trifluoromethylcarbonyloxy group, octanoyloxy group, decanoyloxy group, undecanoyloxy group, octadecanoyloxy group, and the like. The following are further examples of the acyloxy group.

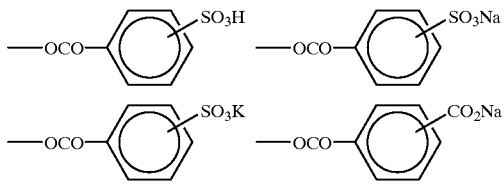

Among the substituents of $R^1$ through $R^4$, the alkoxy group is preferably an alkoxy group having from 1 to 30 carbon atoms. Examples thereof include a methoxy group, ethoxy group, propyloxy group, isopropyloxy group, butoxy group, isobutoxy group, sec-butoxy group, t-butoxy group, pentyloxy group, isopentyloxy group, hexyloxy group, heptyloxy group, octyloxy group, 2-ethylhexyloxy group, decyloxy group, dodecyloxy group, octadecyloxy group, ethoxycarbonylmethyloxy group, 2-ethylhexyloxycarbonylmethyloxy group, aminocarbonylmethyloxy group, N,N-dibutylaminocarbonylmethyloxy group, N-methylaminocarbonylmethyloxy group, N-ethylaminoccarbonylmethyloxy group, N-octylaminocarbonylmethyloxy group, N-methyl-N-benzylaminocarbonylmethyloxy group, benzyloxy group, cyanomethyloxy group, $—O—(CH_2)_mCO_2H$, $—O—(CH_2)_mCO_2Na$, $—O—(CH_2)_mCO_2K$, $—O—(CH_2)_mSO_3H$, $—O—(CH_2)_mSO_3Na$, $—O—(CH_2)_mSO_3K$ (wherein m is an integer from 1 through 4), and the like.

Among the substituents of $R^1$ through $R^4$, the aryloxy group is preferably an aryloxy group having from 6 to 30 carbon atoms. Examples include a phenyloxy group, 1-naphthyloxy group, 2-naphthyloxy group, 2-chlorophenyloxy group, 2-methylphenyloxy 2 group, 2-methoxyphenyloxy group, 2-butoxyphenyloxy group, 3-chlorophenyloxy group, 3-trifluoromethylphenyloxy group, 3-cyanophenyloxy group, 3-(2-ethylhexyloxy) phenyloxy group, 3-nitrophenyloxy group, 4-fluorophenyloxy group, 4-cyanophenyloxy group, 4-butoxyphenyloxy group, 4(2-ethylhexyloxy)phenyloxy group, 4-octadecylphenyloxy group, and the like.

Among the substituents of $R^1$ through $R^4$, the alkylthio group is preferably an alkylthio group having from 1 to 30 carbon atoms. Examples include a methylthio group, ethylthio group, propylthio group, isopropylthio group, butylthio group, isobutylthio group, sec-butylthio group, t-butylthio group, pentylthio group, isopentylthio group, hexylthio group, heptylthio group, octylthio group, 2-ethylhexylthio group, decylthio group, dodecylthio group, octadecylthio group, ethoxycarbonylmethylthio group, 2-ethylhexyloxycarbonylmethylthio group, aminocarbonylmethylthio group, N,N-dibutylaminocarbonylmethyl group, N-methylaminocarbonylmethylthio group, N-ethylaminocarbonylmethylthio group, N-octylaminocarbonylmethylthio group, N-methyl-N-benzylaminocarbonylmethylthio group, benzylthio group, cyanomethylthio group, $—S—(CH_2)_mCO_2H$, $—S—(CH_2)_mCO_2Na$, $—S—(CH_2)_mCO_2K$, $—S—(CH_2)_mSO_3H$, $—S—(CH)_mSO_3Na$, $—S—(CH_2)_mSO_3K$ (wherein m is an integer from 1 to 4), and the like.

Among the substituents of $R^1$ through $R^4$, the arylthio group is preferably an arylthio group having from 6 to 30 carbon atoms. Examples thereof include a phenylthio group, 1-naphthylthio group, 2-naphthylthio group, 2-chlorophenylthio group, 2-methylphenylthio group, 2-methoxyphenylthio group, 2-butoxyphenylthio group, 3-chlorophenylthio group, 3-trifluoromethylphenylthio group, 3-cyanophenylthio group, 3-(2-ethylhexyloxy) phenylthio group, 3-nitrophenylthio group, 4-fluorophenylthio group, 4-cyanophenylthio group, 4-butoxyphenylthio group, 4-(2-ethylhexyloxy)phenylthio group, 4-octadecylphenylthio group, and the like.

Among the substituents of $R^1$ through $R^4$, examples of the substituted sulfamoyl group include sulfamoyl group, N-alkylsulfamoyl group, N-arylsulfamoyl group, N,N-dialkylsulfamoyl group, N,N-diarylsulfamoyl group, and N-alkyl-N-arylsulfamoyl group.

Among the substituents of $R^1$ through $R^4$, the substituted sulfamoyl group is preferably a substituted sulfamoyl group having from 0 to 30 carbon atoms. Examples thereof include N-methylsulfamoyl group, N-ethylsulfamoyl group, N-propylsulfamoyl group, N-butylsulfamoyl group, N-hexylsulfamoyl group, N-cyclohexylsulfamoyl group, N-octylsulfamoyl group, N-2-ethylhexylsulfamoyl group, N-decylsulfamoyl group, N-octadecylsulfamoyl group, N-phenylsulfamoyl group, N-2-methylphenylsulfamoyl group, N-2-chlorophenylsulfamoyl group, N-2-methoxyphenylsulfamoyl group, N-2-isopropoxyphenylsulfamoyl group, N-2-(2-ethylhexyloxy) phenylsulfamoyl group, N-3-chlorophenylsulfamoyl group, N-3-nitrophenylsulfamoyl group, N-3-cyanophenylsulfamoyl group, N-4-methoxysulfamoyl group, N-4-(2'-ethylhexyloxy)phenylsulfamoyl group, N-4-cyanophenylsulfamoyl group, N-methyl-N-phenylsulfamoyl group, N,N-dimethylsulfamoyl group, N,N-dibutylsulfamoyl group, N,N-diphenylsulfamoyl group, N,N-di-(2-ethylhexyl)sulfamoyl group, and the like.

Among the substituents of $R^1$ through $R^4$, alkylsulfonyl groups having 1 through 20 carbon atoms are preferable as the alkylsulfonyl groups. Examples include methylsulfonyl group, ethylsulfonyl group, propylsulfonyl group, isopropylsulfonyl group, butylsulfonyl group, hexylsulfonyl group, cyclohexylsulfonyl group, octylsulfonyl group, 2-ethylhexylsulfonyl group, decanoylsulfonyl group, dodecanoylsulfonyl group, octadecanoylsulfonyl group, cyanomethylsulfonyl group, and the like.

Among the substituents of $R^1$ through $R^4$, arylsulfonyl groups having 6 through 30 carbon atoms are preferable as arylsulfonyl groups. Examples include a phenylsulfonyl group, 1-naphthylsulfonyl group, 2-naphthylsulfonyl group, 2-chlorophenylsulfonyl group, 2-methylphenylsulfonyl group, 2-methoxyphenylsulfonyl group, 2-butoxyphenylsulfonyl group, 3-chlorophenylsulfonyl group, 3-trifluoromethylphenylsulfonyl group, 3-cyanophenylsulfonyl group, 3-(2-ethylhexyloxy)phenylsulfonyl group, 3-nitrophenylsulfonyl group, 4-fluorophenylsulfonyl group, 4-cyanophenylsulfonyl group, 4-butoxyphenylsulfonyl group, 4-(2-ethylhexyloxy)phenylsulfonyl group, 4-octadecylphenylsulfonyl group, and the like.

Among the substituents of $R^1$ through $R^4$, alkylphosphoryl groups having from 2 to 40 carbon atoms are preferable as the alkylphosphoryl groups. Examples thereof include a methylphosphoryl group, ethylphosphoryl group, propylphosphoryl group, isopropylphosphoryl group, butylphosphoryl group, isobutylphosphoryl group, sec-butylphosphoryl group, t-butylphosphoryl group, pentylphosphoryl group, isopentylphosphoryl group, hexylphosphoryl group, heptylphosphoryl group, octylphosphoryl group, 2-ethylhexylphosphoryl group, decylphosphoryl group, dodecylphosphoryl group, octadecylphosphoryl group, ethoxycarbonylmethylphosphoryl group, 2-ethylhexyloxycarbonylmethylphosphoryl group, aminocarbonylmethylphosphoryl group, N,N-dibutylaminocarbonylmethylphosphoryl group, N-methylaminocarbonylmethylphosphoryl group, N-ethylaminocarbonylmethylphosphoryl group, N-octylaminocarbonylmethylphosphoryl group, benzylphosphoryl group, and the like.

Among the substituents of $R^1$ through $R^4$, the arylphosphoryl group is preferably an arylphosphoryl group having from 12 to 50 carbon atoms. Examples thereof are phenylphosphoryl group, 1-naphthylphosphoryl group, 2-naphthylphosphoryl group, 2-chlorophenylphosphoryl group, 2-methylphenylphosphoryl group, 2-methoxyphenylphosphoryl group, 2-butoxyphenylphosphoryl group, 3-chlorophenylphosphoryl group, 3-trifluoromethylphenylphosphoryl group, 3-cyanophenylphosphoryl group, 3-(2-ethylhexyloxy)phenylphosphoryl group, 3-nitrophenylphosphoryl group, 4-fluorophenylphosphoryl group, 4-cyanophenylphosphoryl group, 4-butoxyphenylphosphoryl group, 4-(2-ethylhexyloxy)phenylphosphoryl group, 4-octadecylphenylphosphoryl group, and the like.

Among the substituents of $R^1$ through $R^4$, examples of the substituted amino group are an amino group, N-alkylamino group, N-arylamino group, N-acylamino group, N-sulfonylamino group, N,N-dialkylamino group, N,N-diarylamino group, N-alkyl-N-arylamino group, N,N-disulfonylamino group, and the like.

The substituted amino group is preferably a substituted amino group having 0 to 50 carbon atoms. Examples include N-methylamino group, N-ethylamino group, N-propylamino group, N-isopropylamino group, N-tertbutylamino group, N-hexylamino group, N-cyclohexylamino group, N-octylamino group, N-2-ethylhexylamino group, N-decylamino group, N-octadecylamino group, N-benzylamino group, N-phenylamino group, N-2-methylphenylamino group, N-2-chlorophenylamino group, N-2-methoxyphenylamino group, N-2-isopropoxyphenylamino group, N-2-(2-ethylhexyloxy)phenylamino group, N-3-chlorophenylamino group, N-3-nitrophenylamino group, N-3-cyanophenylamino group, N-4-methoxyamino group, N-4-(2'-ethylhexyloxy)phenylamino group, N-4-cyanophenylamino group, N-methyl-N-phenylamino group, N,N-dimethylamino group, N,N-dibutylamino group, N,N-diphenylamino group, N,N-diacetylamino group, N,N-dibenzoylamino group, N,N-(dibutylcarbonyl)amino group, N-N-(di-2-ethylhexylcarbonyl)amino group, N,N-(dimethylsulfonyl)amino group, N,N-(diethylsulfonyl)amino group, N,N-(dibutylsulfonyl)amino group, N,N-(2-ethylhexylsulfonyl)amino group, N,N-(diphenylsulfonyl)amino group, and the like.

The following are examples of the aforementioned substituted amino groups.

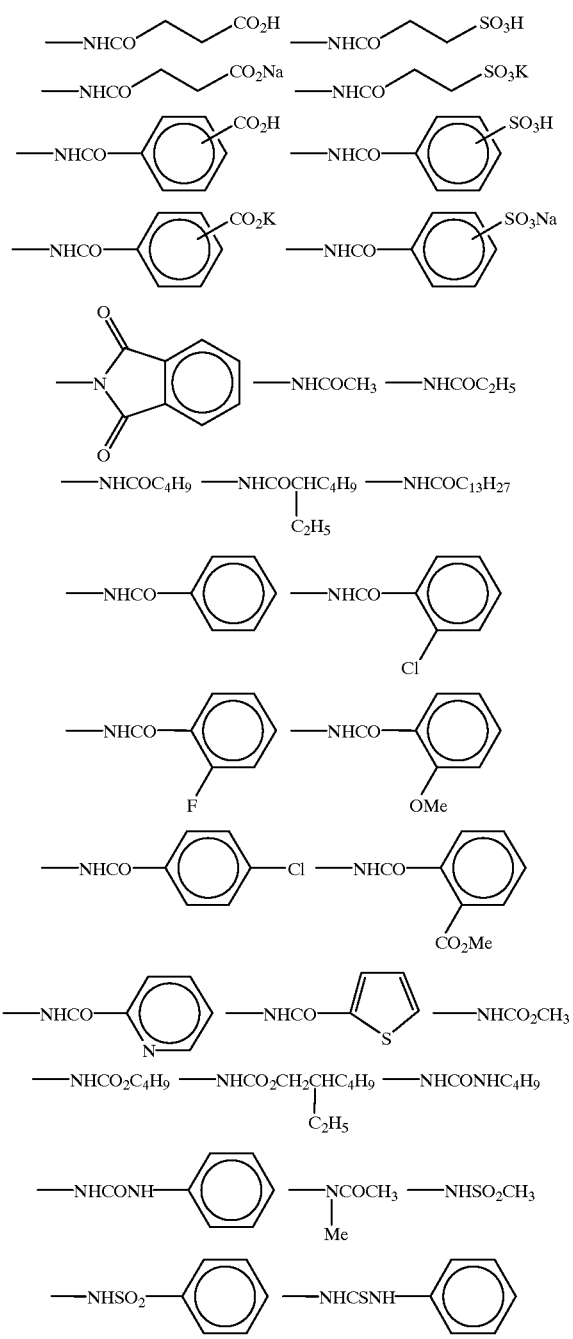

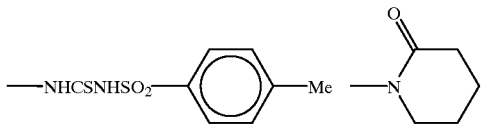

Preferable examples of quaternary ammonium groups among $R^1$ through $R^4$ are tetramethyl ammonium, tetraethyl ammonium, benzyltrimethyl ammonium, and dodecyltrimethyl ammonium. Preferable counter anions are Cl⁻, Br⁻, I⁻, $ClO_4^-$, $BF_4^-$, $PF_6^-$, $HSO_4^-$, $C_6H_5$ (phenyl)—$SO_3^-$, and the like.

Preferable examples of M are Li, Na, K, Mg, Ca, Ba, Al, Zn, Ni, Cu, Fe and the like.

Any one group of $R^1$ through $R^4$ in the two compounds represented by general formula (I) may be a hydrazone dye encompassing two dye structures having a structure connected via a bivalent coupling group.

$R^5$ and $R^6$ in general formula (II) each represent a hydrogen atom, a substituted or unsubstituted alkyl group, or a substituted or unsubstituted aryl group. $R^5$ and $R^6$ may be the same or different. Examples of substituents of $R^5$ and $R^6$ are an alkoxy group, alkoxycarbonyl group, alkylsulfonyl group, substituted amino group, substituted amide group, aryl group, aryloxy group, and the like, but are not limited to these substituents.

The alkyl group is preferably an alkyl group having 1 to 18 carbon atoms. Preferable examples thereof include a methyl group, trifluoromethyl group, ethyl group, propyl group, isopropyl group, butyl group, sec-butyl group, t-butyl group, pentyl group, isopentyl group, cyclopentyl group, hexyl group, cyclohexyl group, octyl group, t-octyl group, 2-ethylhexyl group, nonyl group, octadecyl group, benzyl group, 4-methoxybenzyl group, toluphenylmethyl group, ethoxycarbonylmethyl group, butoxycarbonylmethyl group, 2-ethylhexyloxycarbonylmethyl group, 2',4'-diisopentylphenyloxymethyl group, 2',4'-di-t-butylphenyloxymethyl group, dibenzylaminocarbonylmethyl group, 2,4-di-t-amylphenyloxypropyl group, ethoxycarbonylpropyl group, 1-(2',4'-di-t-amylphenyloxy)propyl group, acetylaminoethyl group, 2-(N,N-dimethylamino)ethyl group, 2-(N,N-diethylamino)propyl group, methanesulfonylaminopropyl group, acetylaminoethyl group, 2-(N,N-dimethylamino)ethyl group, 2-(N,N-diethylamino)propyl group, and the like.

Further, aryl groups having from 6 to 30 carbon atoms are preferable as the aryl group. Examples thereof include a phenyl group, 2-methylphenyl group, 2-chlorophenyl group, 2-methoxyphenyl group, 2-butoxyphenyl group, 2-(2-ethylhexyloxy)phenyl group, 2-octyloxyphenyl group, 3-(2,4-di-t-pentylphenoxyethoxy)phenyl group, 4-chlorophenyl group, 2,5-dichlorophenyl group, 2,4,6-trimethylphenyl group, 3-chlorophenyl group, 3-methylphenyl group, 3-methoxyphenyl group, 3-butoxyphenyl group, 3-cyanophenyl group, 3-(2-ethylhexyloxy)phenyl group, 3,4-dichlorophenyl group, 3,5-dichlorophenyl group, 3,4-dimethoxyphenyl group, 3-(dibutylaminocarbonylmethoxy)phenyl group, 4-cyanophenyl group, 4-methylphenyl group, 4-methoxyphenyl group, 4-butoxyphenyl group, 4-(2-ethylhexyloxy)phenyl group, 4-benzylphenyl group, 4-aminosulfonylphenyl group, 4-N,N-dibutylaminosulfonylphenyl group, 4-ethoxycarbonylphenyl group, 4-(2-ethylhexylcarbonyl)phenyl group, 4-fluorophenyl group, 3-acetylphenyl group, 2-acetylaminophenyl group, 4-(4-chlorophenylthio)phenyl group, 4-(4-methylphenyl)thio-2,5-butoxyphenyl group, 4-(N-benzyl-N-methylamino)-2-dodecyloxycarbonylphenyl group, and the like. However, the aryl group is not particularly limited to these groups. Further, these groups may be substituted by an alkyloxy group, an alkylthio group, a substituted phenyl group, a cyano group, a substituted amino group, a halogen atom, a heterocyclic group or the like.

In general formula (III), $R^{11}$, $R^{12}$ and $R^{13}$ represent substituted or unsubstituted alkyl groups or substituted or unsubstituted aryl groups. $R^{11}$, $R^{12}$ and $R^{13}$ may be the same or different. Examples of substituents thereof include an alkyl group, alkoxy group, alkylthio group, aryl group, aryloxy group, arylthio group, acyl group, alkoxycarbonyl group, carbamoyl group, carboamide group, sulfonyl group, sulfamoyl group, sulfonamide group, ureide group, halogen atom, amino group, heterocyclic group, and the like.

The alkyl group is preferably an alkyl group having 1 to 18 carbon atoms. Preferable examples include methyl group, trifluoromethyl group, ethyl group, propyl group, isopropyl group, butyl group, sec-butyl group, t-butyl group, pentyl group, isopentyl group, cyclopentyl group, hexyl group, cyclohexyl group, octyl group, t-octyl group, 2-ethylhexyl group, nonyl group, octadecyl group, benzyl group, 4-methoxybenzyl group, triphenylmethyl group, ethoxycarbonylmethyl group, butoxycarbonylmethyl group, 2-ethylhexyloxycarbonylmethyl group, 2',4'-diisopentylphenyloxymethyl group, 2',4'-di-t-butylphenyloxymethyl group, dibenzylaminocarbonylmethyl group, 2,4-di-t-amylphenyloxypropyl group, ethoxycarbonylpropyl group, 1-(2',4'-di-t-amylphenyloxy)propyl group, acetylaminoethyl group, 2-(N,N-dimethylamino)ethyl group, 2-(N,N-diethylamino)propyl group, methanesulfonylaminopropyl group, acetylaminoethyl group, 2-(N,N-dimethylamino)ethyl group, 2-(N,N-diethylamino)propyl group, 1-methyl-2-(4-methoxyphenoxy)ethyl group, di-n-butylaminocarbonylmethyl group, di-n-octylaminocarbonylmethyl group, and the like.

Further, as the aryl group, aryl groups having 6 to 30 carbon atoms are preferable. Examples include phenyl group, 2-methylphenyl group, 2-chlorophenyl group, 2-methoxyphenyl group, 2-butyoxyphenyl group, 2-(2-ethylhexyloxy)phenyl group, 2-octyloxyphenyl group, 3-(2,4-di-t-pentylphenoxyethoxy)phenyl group, 4-chlorophenyl group, 2,5-dichlorophenyl group, 2,4,6-trimethylphenyl group, 3-chlorophenyl group, 3-methylphenyl group, 3-methoxyphenyl group, 3-butoxyphenyl group, 3-cyanophenyl group, 3-(2-ethylhexyloxy)phenyl group, 3,4-dichlorophenyl group, 3,5-dichlorophenyl group, 3,4-dimethoxyphenyl group, 3-(dibutylaminocarbonylmethoxy)phenyl group, 4-cyanophenyl group, 4-methylphenyl group, 4-methoxyphenyl group, 4-butoxyphenyl group, 4-(2-ethylhexyloxy)phenyl group, 4-benzylphenyl group, 4-aminosulfonylphenyl group, 4-N,N-dibutylaminosulfonylphenyl group, 4-ethoxycarbonylphenyl group, 4-(2-ethylhexylcarbonyl)phenyl group, 4-fluorophenyl group, 3-acetylphenyl group, 2-acetylaminophenyl group, 4-(4-chlorophenylthio)phenyl group, 4-(4-methylphenyl)thio-2,5-butoxyphenyl group, 4(N-benzyl-N-methylamino)-2-dodecyloxycarbonylphenyl group, and the like, although the aryl groups are not particularly limited to these. Further, these groups may be substituted by an alkyloxy group, an alkylthio group, a substituted phenyl group, a cyano group, a substituted amino group, a halogen atom, a heterocyclic group, or the like.

Examples of the alkyl group and the aryl group of $R^{14}$ in general formula (II) are the same as those for the alkyl group and the aryl group of $R^{11}$ through $R^{13}$. Further, in general formula (II), when $R^{14}$ is an alkoxy group, $R^{14}$ is —$OR^{24}$, and examples of $R^{24}$ are the same as the examples of the alkyl group of $R^{11}$ through $R^{13}$. Further, in general formula (II), when $R^{14}$ is an aryloxy group, $R^{14}$ is —$OR^{25}$, and examples of $R^{25}$ are the same as the examples of the aryl group of $R^{11}$ through $R^{13}$.

Further, when $R^{14}$ is a halogen atom, a chloro group or a fluoro group are preferable.

Examples of the alkyl group and the aryl group of $RI^5$ of general formula (IV) are the same as the examples of the alkyl group and the aryl group of $R^{11}$ through $R^{13}$. Further, examples of the halogens, alkyl groups, aryl groups, alkoxy groups, and aryloxy groups of $R^{16}$ and $R^{17}$ in general formula (IV) are the same as those for $R^{14}$. The alkylthio groups of $R^{16}$ and $R^{17}$ in general formula (IV) are —S—$R^{26}$ and —S—$R^{27}$, and examples of $R^{26}$ and $R^{27}$ are the same as those of the alkyl groups of $R^{11}$ through $R^{13}$. In general formula (IV), the arylthio groups of $R^{16}$ and $R^{17}$ are —S'$R^{28}$ and S—$R^{29}$, and examples of $R^{28}$ and $R^{29}$ are the same as those of the aryl group of $R^{11}$ through $R^{13}$.

Further, examples of the acyl group, carbamoyl group, sulfamoyl group, alkoxycarbonyl group, alkylsulfonyl group and arylsulfonyl group of $R^{20}$ in general formula (V) are the same as those of the acyl group, carbamoyl group, sulfamoyl group, alkoxycarbonyl group, alkylsufonyl group, and arylsulfonyl group of $R^1$ through $R^4$ in general formula (I).

Further, the examples of the acyl group of $R^{21}$ of general formula (V) are the same as those of the acyl group of $R^1$ through $R^4$ of general formula (I).

Further, for an electron attracting group in which the Hammett $\sigma_p$ value of $R^{23}$ in general formula (VI) is 0.25 or more, the following values are preferable: cyano group (up=0.56), $CF_3$—($\sigma_p$=0.54), acetyl group ($\sigma_p$=0.50), benzoyl group ($\sigma_p$=0.43), carbamoyl group ($\sigma_p$=0.36).

The oil-solubility, water-solubility, and pigment structure of the hydrazone dye of the present invention can be controlled by appropriately introducing substituents.

Hereinafter, specific examples of the Ar portion of the hydrazone dye represented by general formula (I) of the present invention are given in Tables 1 through 21, and specific examples of the coupler portion are given in Tables 22 through 53. However, these specific examples of the Ar portion and the coupler portion are not intended to limit the Ar portion and the coupler portion. The Ar portions are numbered by numerals, and the coupler portions are numbered by numerals in parentheses.

TABLE 1

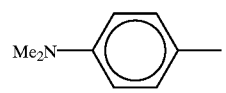
1

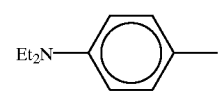
2

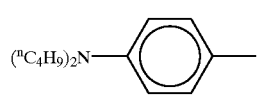
3

TABLE 1-continued

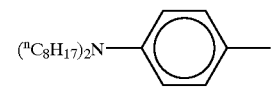
4

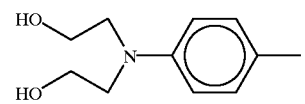
5

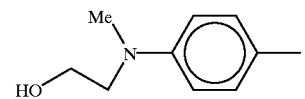
6

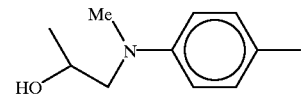
7

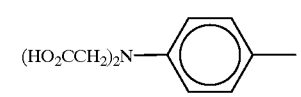
8

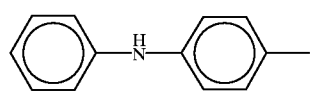
9

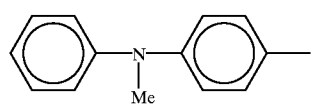
10

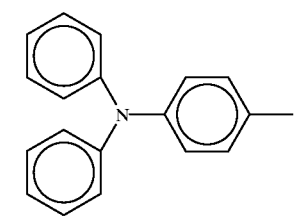
11

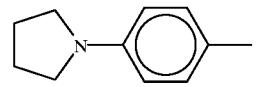
12

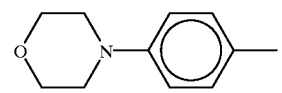
13

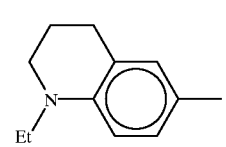
14

TABLE 2
| | |
|---|---|
| 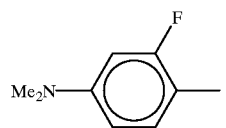 | 15 |
| 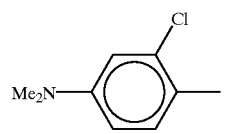 | 16 |
| 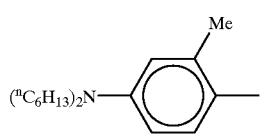 | 17 |
| 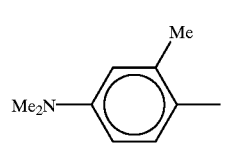 | 18 |
| 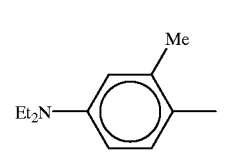 | 19 |
| 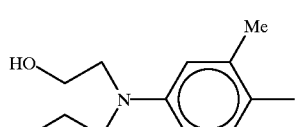 | 20 |
| 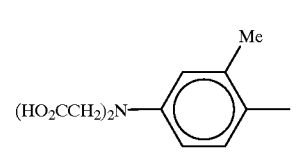 | 21 |
| 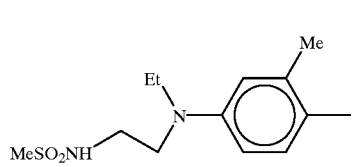 | 22 |
| 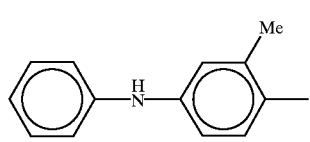 | 23 |
| 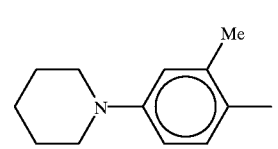 | 24 |
TABLE 2-continued
| | |
|---|---|
| 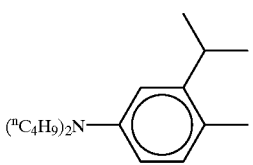 | 25 |
| 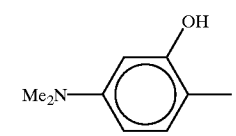 | 26 |
| 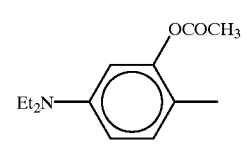 | 27 |
| 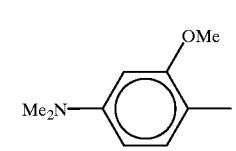 | 28 |
TABLE 3
| | |
|---|---|
| 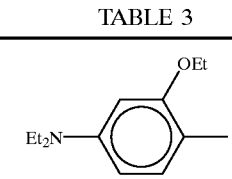 | 29 |
| 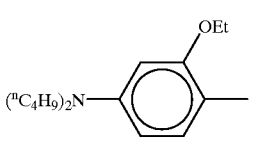 | 30 |
| 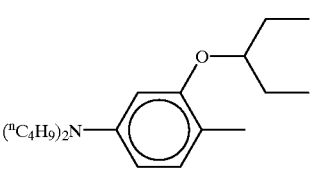 | 31 |
| 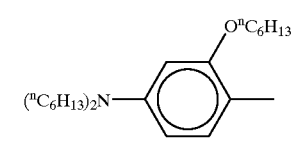 | 32 |
| 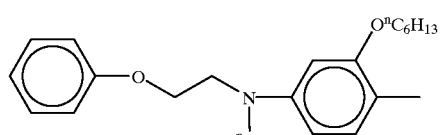 | 33 |

TABLE 3-continued
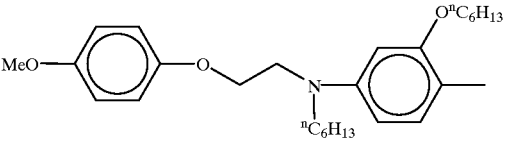 34
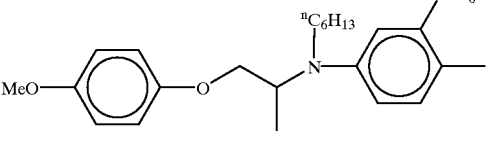 35
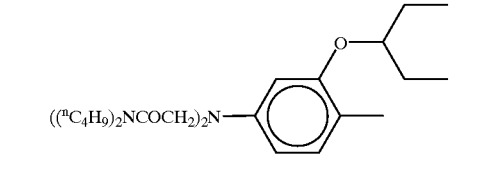 36
TABLE 4
 37
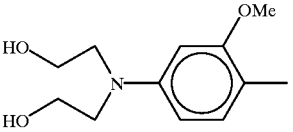 38
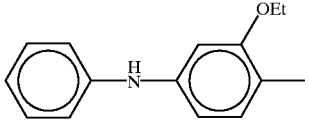 39
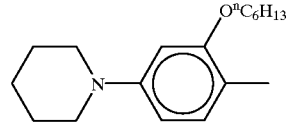 40
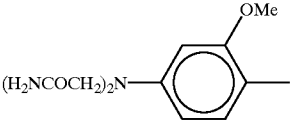 41
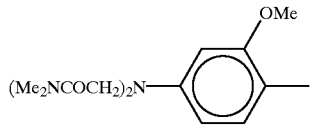 42
TABLE 4-continued
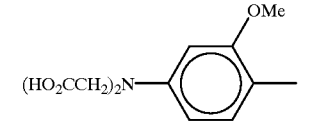 43
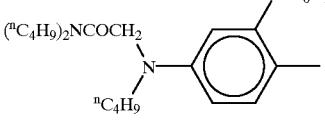 44
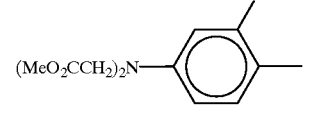 45
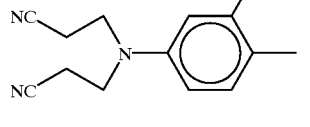 46
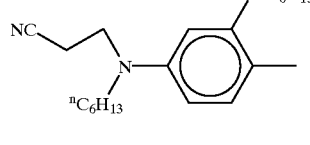 47
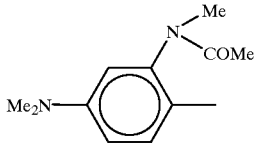 48
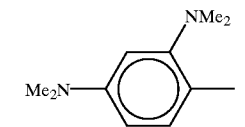 49
TABLE 5
50
51

TABLE 5-continued
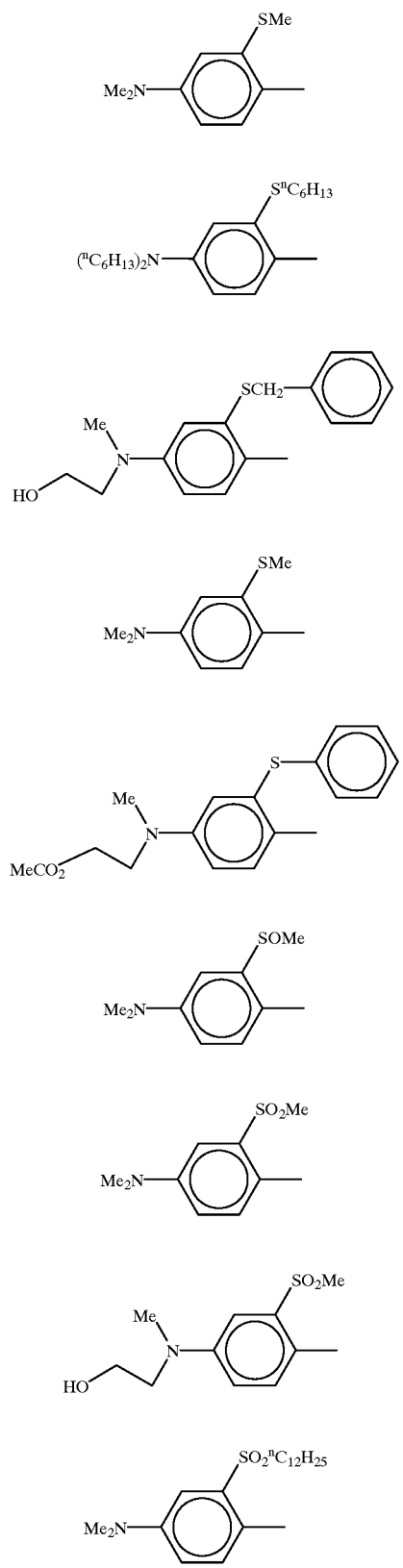
TABLE 5-continued
TABLE 6
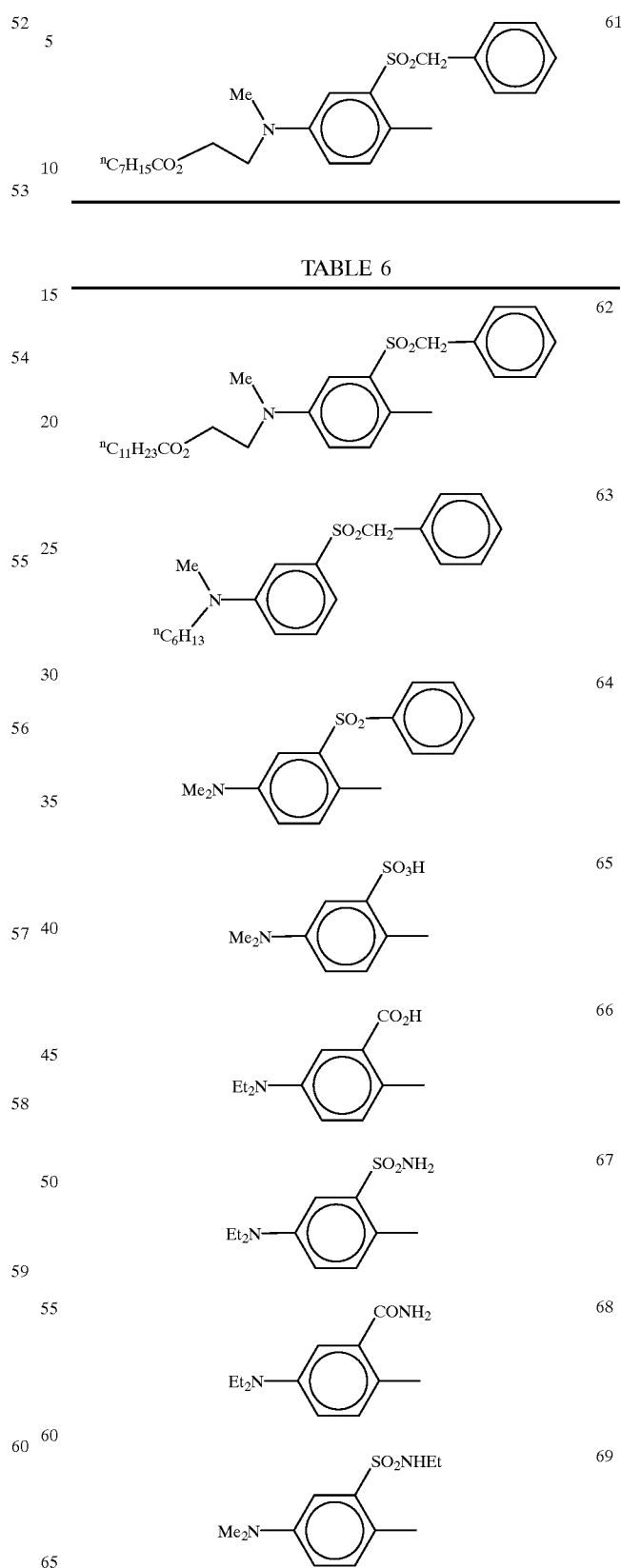

TABLE 6-continued
| | |
|---|---|
| 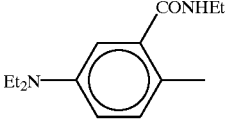 | 70 |
| 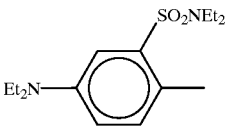 | 71 |
| 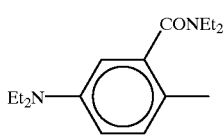 | 72 |
| 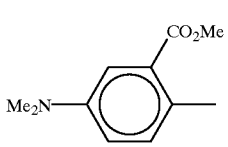 | 73 |
| 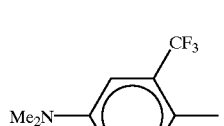 | 74 |
TABLE 7
| | |
|---|---|
| 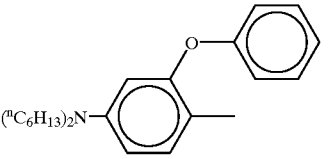 | 75 |
| 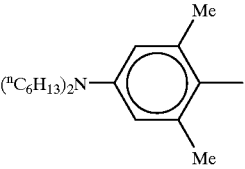 | 76 |
| 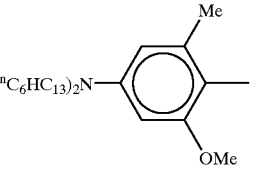 | 77 |
| 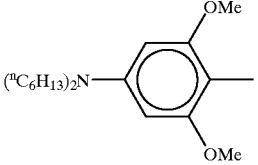 | 78 |
| 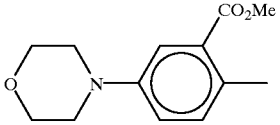 | 79 |
TABLE 7-continued
| | |
|---|---|
| 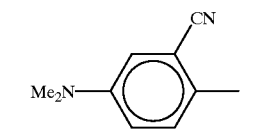 | 80 |
| 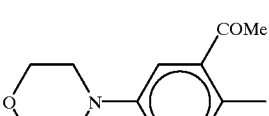 | 81 |
| 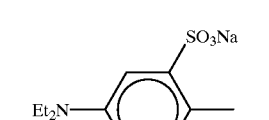 | 82 |
| 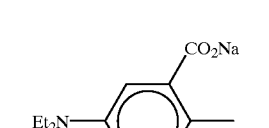 | 83 |
| 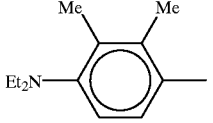 | 84 |
| 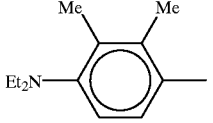 | 85 |
| 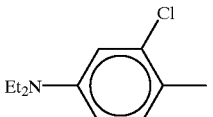 | 86 |
| 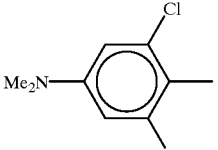 | 87 |

TABLE 7-continued
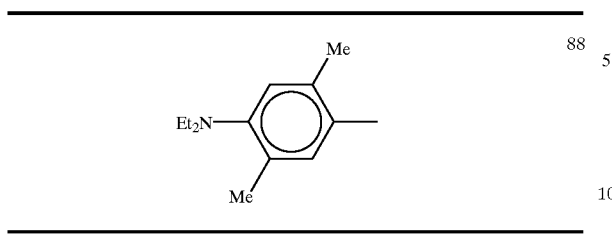
88
TABLE 8
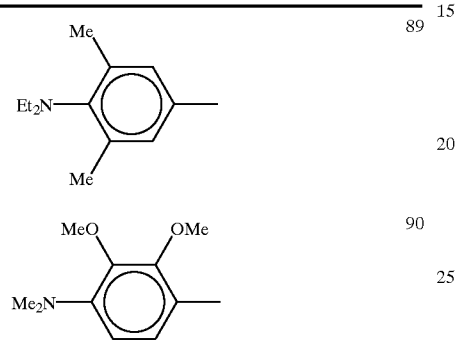
TABLE 8-continued
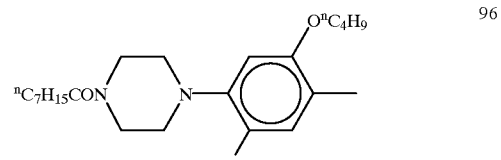
96
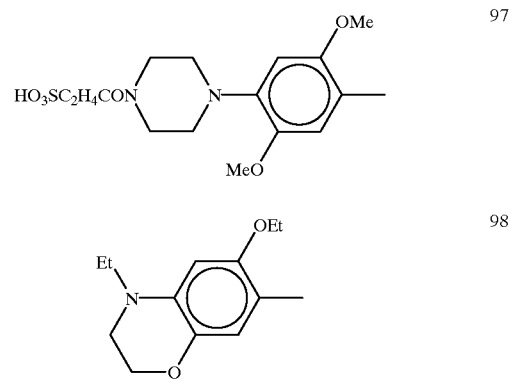
TABLE 9
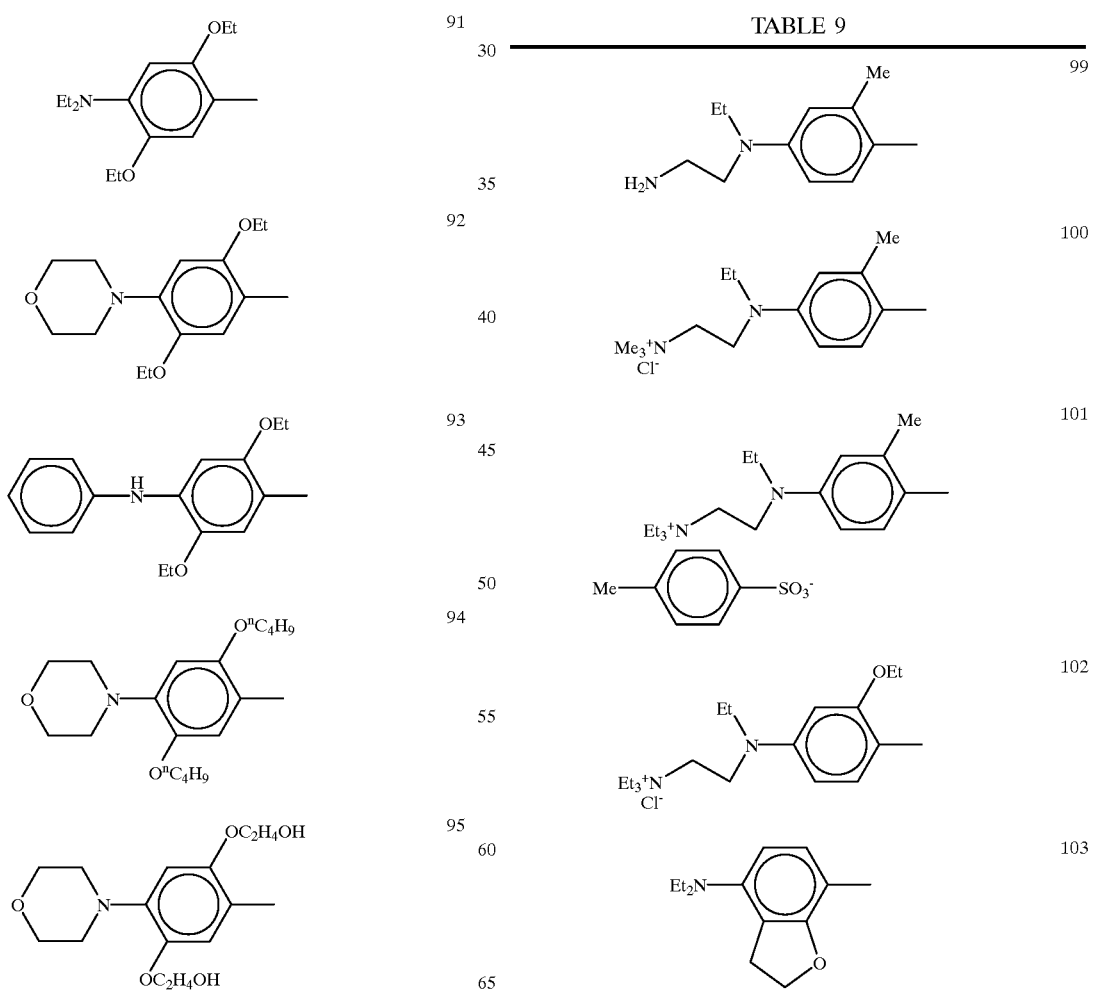

TABLE 9-continued
| | |
|---|---|
| (structure 104) | 104 |
| (structure 105) | 105 |
| (structure 106) | 106 |
| (structure 107) | 107 |
| (structure 108) | 108 |
| (structure 109) | 109 |
| (structure 110) | 110 |
TABLE 10
| | |
|---|---|
| (structure 111) | 111 |
| (structure 112) | 112 |
| (structure 113) | 113 |
TABLE 10-continued
| | |
|---|---|
| (structure 114) | 114 |
| (structure 201) | 201 |
| (structure 202) | 202 |
| (structure 203) | 203 |
| (structure 204) | 204 |
| (structure 205) | 205 |
| (structure 206) | 206 |
| (structure 207) | 207 |
| (structure 208) | 208 |
TABLE 11
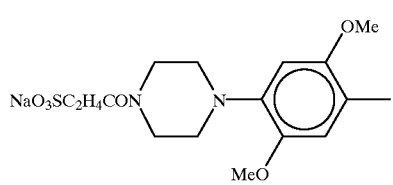
209

TABLE 11-continued
| | |
|---|---|
| 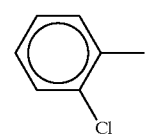 | 210 |
| 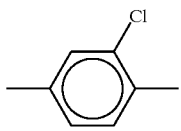 | 211 |
| 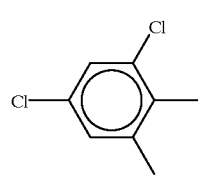 | 212 |
| 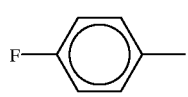 | 213 |
| 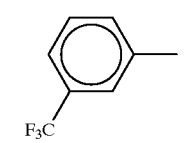 | 214 |
| 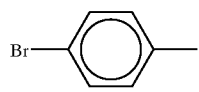 | 215 |
| 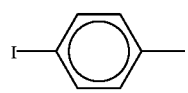 | 216 |
| 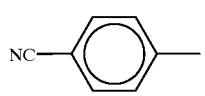 | 217 |
| 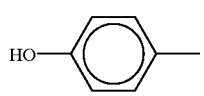 | 218 |
| 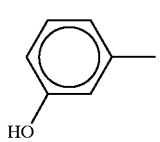 | 219 |
| 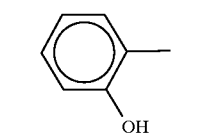 | 220 |
| 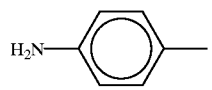 | 221 |
TABLE 11-continued
| | |
|---|---|
| 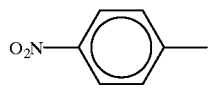 | 222 |
TABLE 12
| | |
|---|---|
| 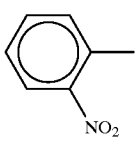 | 223 |
| 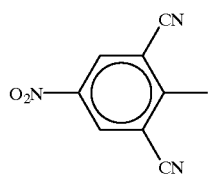 | 224 |
| 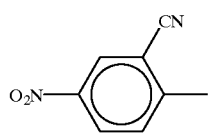 | 225 |
| 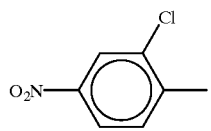 | 226 |
| 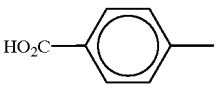 | 227 |
| 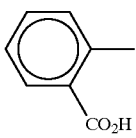 | 228 |
| 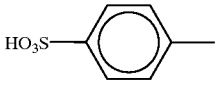 | 229 |
| 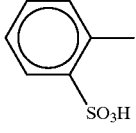 | 230 |
| 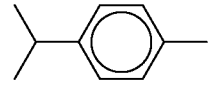 | 231 |
| 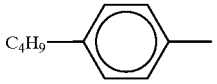 | 232 |

TABLE 12-continued
| | |
|---|---|
| 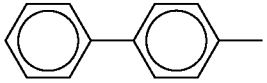 | 233 |
| 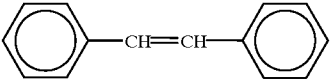 | 234 |
| 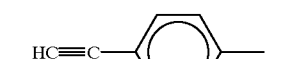 | 235 |
| 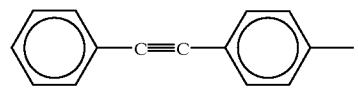 | 236 |
TABLE 13
| | |
|---|---|
| 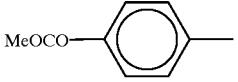 | 237 |
| 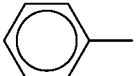 | 238 |
| 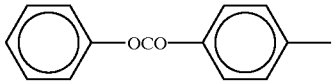 | 239 |
| 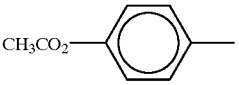 | 240 |
| 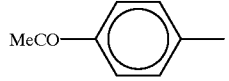 | 241 |
| 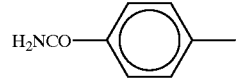 | 242 |
| 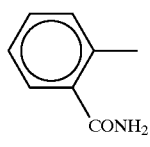 | 243 |
| 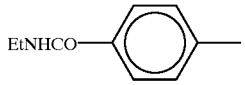 | 244 |
| 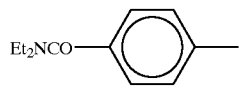 | 245 |
TABLE 13-continued
| | |
|---|---|
| 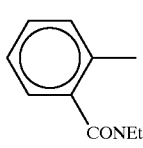 | 246 |
| 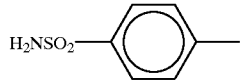 | 247 |
| 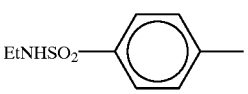 | 248 |
| 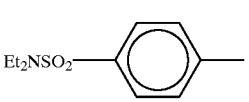 | 249 |
| 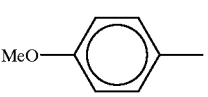 | 250 |
TABLE 14
| | |
|---|---|
| 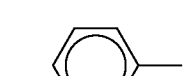 | 251 |
| 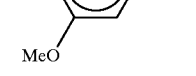 | 252 |
| 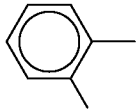 | 253 |
| 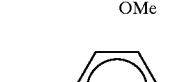 | 254 |
| 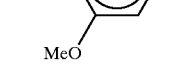 | 255 |
| 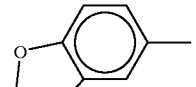 | 256 |

TABLE 14-continued

| | No. |
|---|---|
| 4-MeO, 3-Me, (benzene with Me and MeO) | 257 |
| 4-MeO, 3-Cl (benzene) | 258 |
| 4-(HOC$_2$H$_4$O)-C$_6$H$_4$-Me | 259 |
| 4-(HOCOCH$_2$O)-C$_6$H$_4$-Me | 260 |
| 4-(HO$_3$SCH$_2$O)-C$_6$H$_4$-Me | 270 |
| 4-(H$_2$NC$_2$H$_4$O)-C$_6$H$_4$-Me | 280 |
| 4-(Me$_3$N$^+$C$_2$H$_4$O)-C$_6$H$_4$-Me, Cl$^-$ | 281 |
| 4-(MeOC$_2$H$_4$O)-C$_6$H$_4$-Me | 282 |

TABLE 15

| | No. |
|---|---|
| Ph-OC$_2$H$_4$O-C$_6$H$_4$-Me | 283 |
| Ph-OC$_2$H$_4$O-C$_6$H$_3$(Me)-Me | 284 |
| (di-t-Bu-phenyl)-OC$_2$H$_4$O-C$_6$H$_3$(Me)-Me | 285 |
| 4-($^n$C$_{10}$H$_{21}$O)-C$_6$H$_4$-Me | 286 |

TABLE 15-continued

| | No. |
|---|---|
| 4-($^n$C$_{10}$H$_{21}$O), 3-Me (benzene with Me) | 287 |
| 4-($^n$C$_6$H$_{13}$O), 2-(O$^n$C$_6$H$_{13}$) (benzene with Me) | 288 |
| 4-(Et$_2$NCOCH$_2$O)-C$_6$H$_4$-Me | 289 |
| 2-(HO$_2$C)-C$_6$H$_4$-OC$_2$H$_4$O-C$_6$H$_3$(Me)-Me | 290 |
| 4-MeO, 3,5-di-Me (benzene) | 291 |
| 4-MeO, 2,5-di-OMe, 3-Me (benzene) | 292 |
| Ph-O-C$_6$H$_4$-Me | 293 |
| 4-(MeS)-C$_6$H$_4$-Me | 294 |

TABLE 16

| | No. |
|---|---|
| 3-(EtS)-C$_6$H$_4$-Me | 295 |
| 2-Me-C$_6$H$_4$-SCH$_2$-Ph | 296 |

TABLE 16-continued

297: structure with MeO, SCH2-phenyl on methylbenzene

298: phenyl-CH2S- on methoxymethylbenzene

299: nC6H13S-, SnC6H13 on methylbenzene

300: phenyl-S-tolyl

301: phenyl-O- on dimethoxymethylbenzene (OMe, MeO)

302: phenyl-O- on methoxymethylbenzene

303: phenyl-S- on methoxymethylbenzene

304: phenyl-S- on dimethoxymethylbenzene (OMe, MeO)

305: Me-phenyl-S- on di(O^nC4H9)methylbenzene

TABLE 16-continued

306: Cl-phenyl-S- on di(O^nC4H9)methylbenzene

307: phenyl(CO2H)-S- on di(OC2H5)methylbenzene

308: HO2CCH2S- on di(OC2H5)methylbenzene

TABLE 17

309: phenyl-CH2SO2-tolyl

310: MeSO2- on methylbenzene with two CN groups

311: phenyl-SO2-tolyl

312: phenyl-SO2- on methylbenzene with two CN groups

313: CH3CONH- on methylbenzene

314: phenyl-CONH- on di(OEt)methylbenzene

TABLE 17-continued
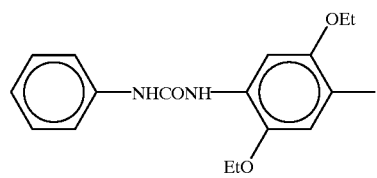 315
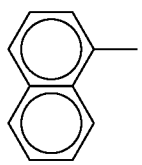 316
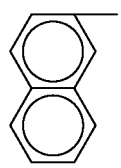 317
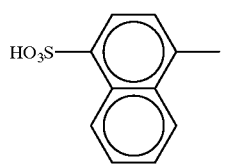 318
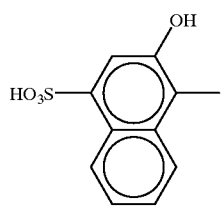 319
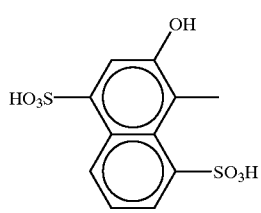 320
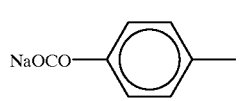 321
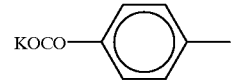 322
TABLE 18
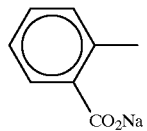 323
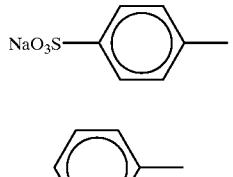 324
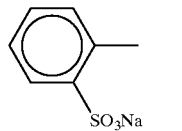 325
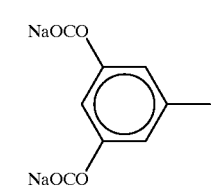 326
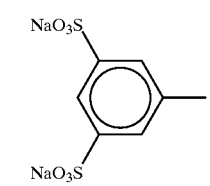 327
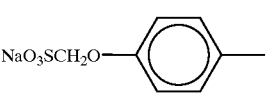 328
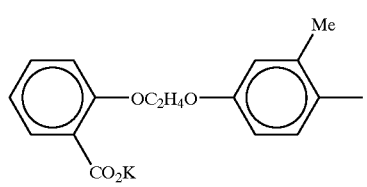 329
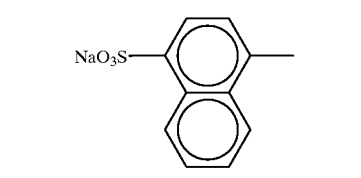 330
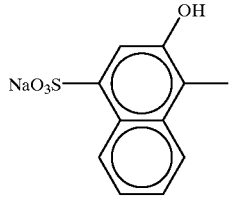 331

TABLE 18-continued

| # | Structure |
|---|---|
| 332 | 3-hydroxy-4-methyl-naphthalene-1,5-disulfonic acid disodium salt (NaO₃S, OH, Me, SO₃Na on naphthalene) |
| 401 | 4-phenyl-1,2,5-trimethyl-pyrrole-3-carbonitrile |
| 402 | ethyl 4-phenyl-1,2,5-trimethyl-pyrrole-3-carboxylate |

TABLE 19

| # | Structure |
|---|---|
| 403 | 2-methylfuran |
| 404 | 2,5-dimethylfuran |
| 405 | 2-methylthiophene |
| 406 | 4-(5-methylthiophen-2-yl)morpholine |
| 407 | N,N-dimethyl-5-methylthiophen-2-amine |
| 408 | 4-phenyl-2,5-dimethyl-1H-imidazole |
| 409 | 5-methyl-1H-imidazole |
| 410 | 5-methyl-1-phenyl-1H-pyrazole |
| 411 | 3,5-dimethyl-1H-pyrazole-4-carbonitrile |
| 412 | 4-phenyl-2,5-dimethylthiazole |
| 413 | 4-phenyl-2,5-dimethylthiophene-3-carbonitrile |
| 414 | 4-phenyl-2,5-dimethylthiazole |

TABLE 20

| # | Structure |
|---|---|
| 415 | 2,5-dimethyl-1,3,4-thiadiazole |
| 416 | N,N-dimethyl-4-phenyl-5-methylthiazol-2-amine |

TABLE 20-continued
| | |
|---|---|
| 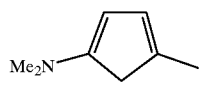 | 417 |
| 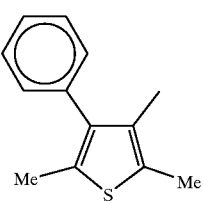 | 418 |
| 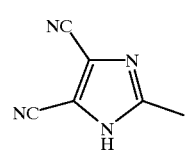 | 419 |
| 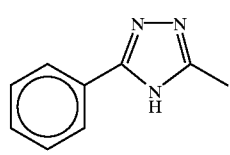 | 420 |
| 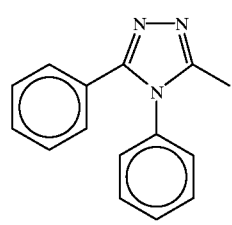 | 421 |
| 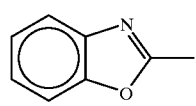 | 422 |
| 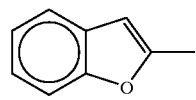 | 423 |
| 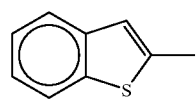 | 424 |
| 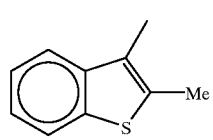 | 425 |
| 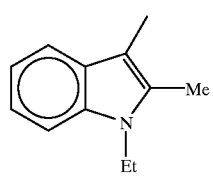 | 426 |
TABLE 21
| | |
|---|---|
| 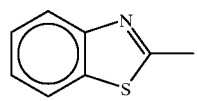 | 427 |
| 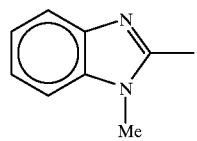 | 428 |
| 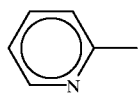 | 429 |
| 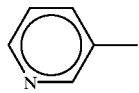 | 430 |
| 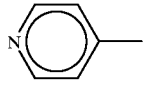 | 431 |
| 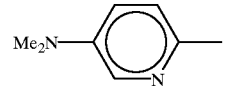 | 432 |
| 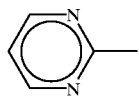 | 433 |
| 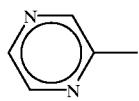 | 434 |
| | 435 |
| | 436 |
| | 437 |
| | 438 |

Next, specific examples of the coupler portions of the dyes of the present invention are given.

TABLE 22

For the [structure shown] portion in general formula (I)

$P^1$ is $CR^2$ or $N$

| | —$R^1$ | —$R^2$ | —$R^3$ | —$R^4$ |
|---|---|---|---|---|
| (1) | —H | —H | —Ph | —CN |
| (2) | —H | —H | —Ph | [2,6-di-tert-butyl-4-methylcyclohexyl carboxylate group] |
| (3) | —Me | —H | —Ph | —CN |
| (4) | —$C_4H_9$(t) | —H | —Ph | —CN |
| (5) | —$(CH_2)_7CH=CHC_8H_{17}$ | —H | —Ph | —CN |
| (6) | —$CH_2OPh$ | —H | —Ph | —CN |
| (7) | —$(CH_2)_2CO_2Et$ | —H | —Ph | —CN |
| (8) | —$CF_3$ | —H | —Ph | —CN |

TABLE 23

| | —$R^1$ | —$R^2$ | —$R^3$ | —$R^4$ |
|---|---|---|---|---|
| (9) | —Me | —H | 4-methylphenyl | —CN |
| (10) | —Me | —H | 2-methylphenyl | —CN |
| (11) | —Me | —H | 4-chlorophenyl | —CN |
| (12) | —Me | —H | 3-chlorophenyl | —CN |
| (13) | —Me | —H | 3,4-dichlorophenyl | —CN |
| (14) | —Me | —H | 3,4-dichlorophenyl | —CN |

TABLE 24

| | —$R^1$ | —$R^2$ | —$R^3$ | —$R^4$ |
|---|---|---|---|---|
| (15) | —Me | —H | 2,3-dichlorophenyl | —CN |
| (16) | —Me | —H | 4-methoxyphenyl | —CN |
| (17) | —Me | —H | 3-methoxyphenyl | —CN |

TABLE 24-continued

| | —R¹ | —R² | —R³ | —R⁴ |
|---|---|---|---|---|
| (18) | —Me | —H | 2-MeO-phenyl | —CN |
| (19) | —Me | —H | 4-F-phenyl | —CN |
| (20) | —Me | —H | 4-CF₃-phenyl | —CN |
| (21) | —Me | —H | 4-NHCOMe-phenyl | —CN |

TABLE 25

| | —R¹ | —R² | —R³ | —R⁴ |
|---|---|---|---|---|
| (22) | —Me | —H | 3-NHCOMe-phenyl | —CN |
| (23) | —Me | —H | 2-NHCOMe-phenyl | —CN |
| (24) | —Ph | —H | —Ph | —CN |
| (25) | 2-NHCOMe-phenyl | —H | —Ph | —CN |
| (26) | —OEt | —H | —Ph | —CN |
| (27) | —OEt | —H | 4-Cl-phenyl | —CH₂CO₂-(2,6-di-tert-butyl-4-methylcyclohexyl) |
| (28) | —NH₂ | —H | —Ph | —CN |
| (29) | —NHCOMe | —H | —Ph | —CN |

TABLE 26

| —R¹ | —R² | —R³ | —R⁴ |
|---|---|---|---|
| (30) —NHCOCHO—(2,5-di-tert-butylphenyl), with CHEt branch | —H | —Ph | —CN |
| (31) —NHCOMe | —H | 4-Cl-C₆H₄— | —CO₂-(2,6-di-tert-butyl-4-methylcyclohexyl) |
| (32) —NHCOCH(C₂H₅)C₄H₉(n) | —H | 4-Cl-C₆H₄— | —CO₂-(2,6-di-tert-butyl-4-methylcyclohexyl) |
| (33) —NHCOCH(C₂H₅)C₄H₉(n) | —H | 4-Cl-C₆H₄— | —CO₂Et |
| (34) —NHCOCF₃ | —H | 4-Cl-C₆H₄— | —CO₂-(2,6-di-tert-butyl-4-methylcyclohexyl) |

TABLE 27

| —R¹ | —R² | —R³ | —R⁴ |
|---|---|---|---|
| (35) —N(COCH(C₂H₅)C₄H₉(n))₂ | —H | 4-Cl-C₆H₄— | —CO₂-(2,6-di-tert-butyl-4-methylcyclohexyl) |

TABLE 27-continued

| —R¹ | —R² | —R³ | —R⁴ |
|---|---|---|---|
| (36) —NHCOCH(C₂H₅)C₄H₉(n) | —H | 3,4-dichlorophenyl | —CO₂-(2,6-di-tert-butyl-4-methylcyclohexyl) |
| (37) —NHCOCH(C₂H₅)C₄H₉(n) | —H | —Ph | —SO₂Ph |
| (38) —NHCOPh | —H | —Ph | —CO₂-(2,6-di-tert-butyl-4-methylcyclohexyl) |
| (39) —NHCO-(2-chlorophenyl) | —H | 2-chlorophenyl | —CO₂-(2,6-di-tert-butyl-4-methylcyclohexyl) |

TABLE 28

| —R¹ | —R² | —R³ | —R⁴ |
|---|---|---|---|
| (40) —NHCO-(2-fluorophenyl) | —H | —Ph | —CO₂-(2,6-di-tert-butyl-4-methylcyclohexyl) |
| (41) —NHCO-(2-thienyl) | —H | —Ph | —CO₂-(2,6-di-tert-butyl-4-methylcyclohexyl) |

TABLE 28-continued
| | —R¹ | —R² | —R³ | —R⁴ |
|---|---|---|---|---|
| (42) | —SPh | —H | —Ph | 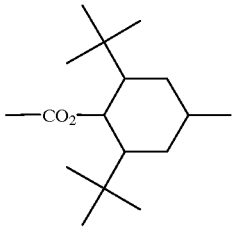 |
| (43) | —NMe₂ | —H | —Ph | —CN |
| (44) | —NHSO₂Me | —H | —Ph | —CN |
| (45) | —NHCO₂Et | —H | —Ph | —CN |
| (46) | —NHCO₂Et | —H | 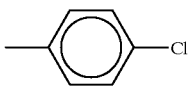 | 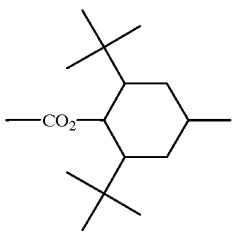 |
TABLE 29
| | —R¹ | —R² | —R³ | —R⁴ |
|---|---|---|---|---|
| (47) | —NHCONHC₄H₉(n) | —H | 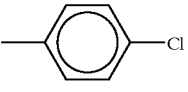 | 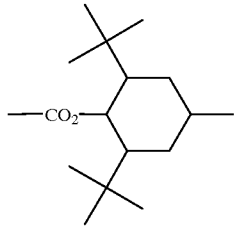 |
| (48) | —NHCONHC₄H₉(n) | —H | —Ph | —CN |
| (49) | —NHCONMe₂ | —H | —Ph | —CN |
| (50) | —NHCONMe₂ | —H |  | 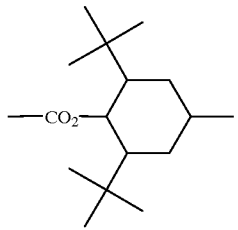 |
| (51) | 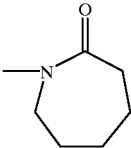 | —H |  | 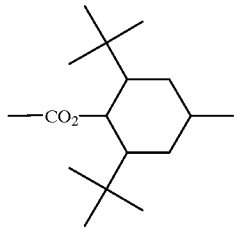 |
| (52) | —H | —Me | —Ph | —CN |

TABLE 29-continued

| | —R¹ | —R² | —R³ | —R⁴ |
|---|---|---|---|---|
| (53) | —H | —CO₂Et | —Ph | —CN |
| (54) | —H | —CN | —Ph | —CN |
| (55) | —H | —Ph | —Ph | —CN |
| (56) | —Me | —Me | —Ph | —CN |

TABLE 30

| | —R¹ | —R² | —R³ | —R⁴ |
|---|---|---|---|---|
| (57) | —Me | —Cl | —Ph | —CN |
| (58) | —Me | —CO₂Et | —Ph | —CN |
| (59) | —Me | —CN | —Ph | —CN |
| (60) | —Me | —Ph | —Ph | —CN |
| (61) | —Me | —OMe | —Ph | —CN |
| (62) | —Me | —NHCOMe | —Ph | —CN |
| (63) | —Cl | —H | —Ph | —CO₂-(2,6-di-tert-butyl-4-methylcyclohexyl) |
| (64) | —Cl | —Me | —Ph | —CN |
| (65) | —Ph | —Me | —Ph | —CN |
| (66) | —C₆H₄-Cl (p) | —CN | —Ph | —CN |
| (67) | —OEt | —Me | —C₆H₄-Cl (p) | —CO₂-(2,6-di-tert-butyl-4-methylcyclohexyl) |
| (68) | —OEt | —Me | —Ph | —CN |

TABLE 31

| | —R¹ | —R² | —R³ | —R⁴ |
|---|---|---|---|---|
| (69) | —NH₂ | —Me | —C₆H₄-Cl (p) | —CO₂-(2,6-di-tert-butyl-4-methylcyclohexyl) |

TABLE 31-continued

|  | —R¹ | —R² | —R³ | —R⁴ |
|---|---|---|---|---|
| (70) | —NH₂ | —Me | 3,4-dichlorophenyl | 2,6-di-tert-butyl-4-methylcyclohexyl —CO₂— |
| (71) | —NH₂ | —Cl | 4-chlorophenyl | 2,6-di-tert-butyl-4-methylcyclohexyl —CO₂— |
| (72) | —NH₂ | —OEt | 4-chlorophenyl | 2,6-di-tert-butyl-4-methylcyclohexyl —CO₂— |
| (73) | —NH₂ | —Ph | —Ph | —CN |
| (74) | —NH₂ | —COMe | —Ph | —CN |
| (75) | —NH₂ | —COCH₂OPh | —Ph | —CN |

TABLE 32

|  | —R¹ | —R² | —R³ | —R⁴ |
|---|---|---|---|---|
| (76) | —NH₂ | —COCH₂SPh | —Ph | —CN |
| (77) | —NH₂ | —COCH₂Cl | —Ph | —CN |
| (78) | —NH₂ | —COCH₂NHPh | —Ph | —CN |
| (79) | —NH₂ | —CONHSO₂—(4-methylphenyl) | —Ph | —CN |
| (80) | —NH₂ | —CONHSO₂NHPh | —Ph | —CN |
| (81) | —NH₂ | —COMe | 4-chlorophenyl | 2,6-di-tert-butyl-4-methylcyclohexyl —CO₂— |

TABLE 32-continued
| | —R¹ | —R² | —R³ | —R⁴ |
|---|---|---|---|---|
| (82) | —NH₂ | —COCH₂OPh |  | 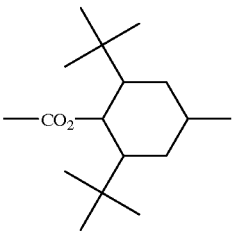 |
| (83) | —NH₂ | —COCH₂SPh | 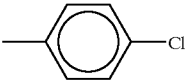 | 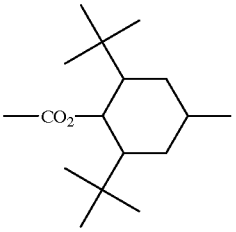 |
TABLE 33
| | —R¹ | —R² | —R³ | —R⁴ |
|---|---|---|---|---|
| (84) | —NH₂ | —COCOH₂Cl | 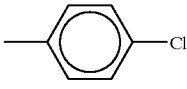 | 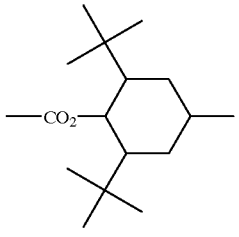 |
| (85) | —NH₂ | —CONHSO₂–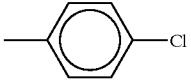–Me | 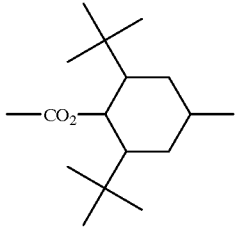 | 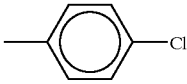 |
| (86) | —NH₂ | —CONHSO₂NHPh | 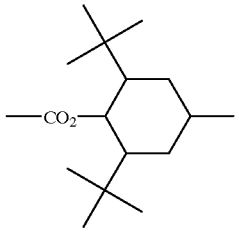 | |

TABLE 33-continued

| —R¹ | —R² | —R³ | —R⁴ |
|---|---|---|---|
| (87) —NH₂ | —CONHSO₂NMe₂ | 4-Cl-C₆H₄– | 2,6-di-tert-butyl-4-methylcyclohexyl-OC(O)– |
| (88) —NH₂ | —CONH₂ | 4-Cl-C₆H₄– | 2,6-di-tert-butyl-4-methylcyclohexyl-OC(O)– |

TABLE 34

| —R¹ | —R² | —R³ | R⁴ |
|---|---|---|---|
| (89) —NH₂ | —CN | 4-Cl-C₆H₄– | 2,6-di-tert-butyl-4-methylcyclohexyl-OC(O)– |
| (90) —NH₂ | —COPh | 4-Cl-C₆H₄– | 2,6-di-tert-butyl-4-methylcyclohexyl-OC(O)– |
| (91) —NH₂ | —CO₂Et | 4-Cl-C₆H₄– | 2,6-di-tert-butyl-4-methylcyclohexyl-OC(O)– |

TABLE 34-continued

| —R¹ | —R² | —R³ | R⁴ |
|---|---|---|---|
| (92) —NH₂ | —SO₂Ph | 4-Cl-C₆H₄— | —CO₂-(2,6-di-tert-butyl-4-methylcyclohexyl) |
| (93) —NH₂ | —COMe | 3,4-di-Cl-C₆H₃— | —CO₂-(2,6-di-tert-butyl-4-methylcyclohexyl) |

TABLE 35

| —R¹ | —R² | —R³ | —R⁴ |
|---|---|---|---|
| (94) —NH₂ | —COCH₂Cl | 3,4-di-Cl-C₆H₃— | —CO₂-(2,6-di-tert-butyl-4-methylcyclohexyl) |
| (95) —NH₂ | —COCH₂SPh | 3,4-di-Cl-C₆H₃— | —CO₂-(2,6-di-tert-butyl-4-methylcyclohexyl) |
| (96) —NH₂ | —CONHSO₂NHPh | 3,4-di-Cl-C₆H₃— | —CO₂-(2,6-di-tert-butyl-4-methylcyclohexyl) |

TABLE 35-continued

| —R¹ | —R² | —R³ | —R⁴ |
|---|---|---|---|
| (97) —NH₂ | —COMe | 2-chlorophenyl | —CO₂-(2,6-di-tert-butyl-4-methylcyclohexyl) |
| (98) —NH₂ | —COMe | —Ph | —CO₂-(2,6-di-tert-butyl-4-methylcyclohexyl) |

TABLE 36

| —R¹ | —R² | —R³ | —R⁴ |
|---|---|---|---|
| (99) —NH₂ | —CHO | 4-chlorophenyl | —CO₂-(2,6-di-tert-butyl-4-methylcyclohexyl) |
| (100) —NH₂ | —COCH=CHPh | 4-chlorophenyl | —CO₂-(2,6-di-tert-butyl-4-methylcyclohexyl) |
| (101) —NH₂ | —CONHSO₂-(4-methylphenyl) | —Ph | —SO₂Ph |
| (102) —NH₂ | —CONHSO₂-(4-methylphenyl) | 4-chlorophenyl | —CONH₂ |
| (103) —NH₂ | —CONHSO₂-(4-methylphenyl) | 3,4-dichlorophenyl | —CONH-CH₂CH(Et)(n-Bu) |
| (104) —NHCOMe | —Me | —Ph | —CN |

TABLE 36-continued
| —R¹ | —R² | —R³ | —R⁴ |
|---|---|---|---|
| (105) —NHCOMe | —Cl | —Ph | 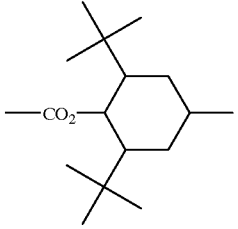 |
TABLE 37
| | —R¹ | —R² | —R³ | —R⁴ |
|---|---|---|---|---|
| (106) | —NHCOMe | —COMe |  | 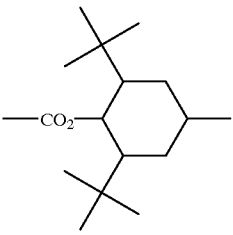 |
| (107) | —NHCOMe | 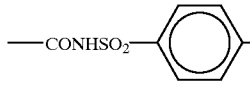 |  | 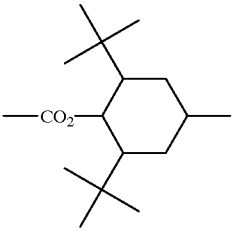 |
| (108) | —NHSO₂Me | —COMe | —Ph | —CN |
| (109) | —NMe₂ | —COMe | —Ph | —CN |
| (110) | —SPh | —COMe | —Ph | —CN |
| (111) | —SO₂Ph | —H | —Ph | —CN |
| (112) | —SO₂Ph | —COMe | —Ph | —CN |
| (113) | —NHCOMe | —COMe | 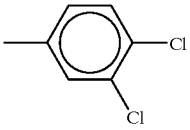 |  |
| (114) | 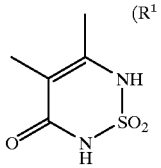 (R¹ and R² form a ring) | |  | 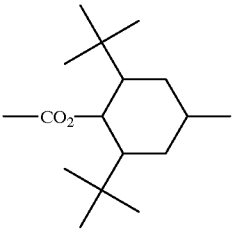 |

TABLE 38

| | —R¹ | —R² | —R³ | —R⁴ |
|---|---|---|---|---|
| (115) | —H | —H | —CN | —Ph |
| (116) | —H | —H | —CO₂Et |  4-Cl-C₆H₄— |
| (117) | —H | —H | —CO₂Et | —CO₂Et |
| (118) | —Me | —H | —CN | —Ph |
| (119) | —Me | —H | —CO₂Et |  4-Cl-C₆H₄— |
| (120) | —Me | —H | —CO₂Et | —CO₂Et |
| (121) | —Me | —H | —CONH-CH(C₂H₅)C₄H₉ | —CONH-CH(C₂H₅)C₄H₉ |
| (122) | —Me | —H | —CONEt₂ | —CONEt₂ |
| (123) | —Me | —H | —CO₂H | —CO₂Et |
| (124) | —Me | —H | —CN | —CN |
| (125) | —Ph | —H | —CO₂Et | —CO₂Et |
| (126) | —OEt | —H | —CO₂Et | —CO₂Et |
| (127) | —NH₂ | —H | —CO₂Et | —CO₂Et |
| (128) | —NHCOMe | —H | —CO₂Et | —CO₂Et |
| (129) | —NH₂ | —H | —CN | —Ph |

TABLE 39

| | —R¹ | —R² | —R³ | —R⁴ |
|---|---|---|---|---|
| (130) | —NH₂ | —H | —CO₂Et | 4-Cl-C₆H₄— |
| (131) | —NHCOMe | —H | —CN | —Ph |
| (132) | —NHCOMe | —H | —CO₂Et | 3,4-Cl₂-C₆H₃— |
| (133) | —H | —CN | —CO₂Et | —CO₂Et |
| (134) | —Me | —CN | —CO₂Et | —CO₂Et |
| (135) | —Cl | —H | —CO₂Et | —CO₂Et |
| (136) | —Ph | —CN | —CO₂Et | —CO₂Et |
| (137) | —OEt | —Me | —CO₂Et | —CO₂Et |
| (138) | —NH₂ | —Me | —CO₂Et | —CO₂Et |
| (139) | —NH₂ | —Cl | —CO₂Et | —CO₂Et |
| (140) | —NH₂ | —COMe | —CO₂Et | —CO₂Et |
| (141) | —NH₂ | —COMe | —CN | —CN |
| (142) | —NH₂ | —H | —CN | —CN |
| (143) | —NH₂ | —CONHSO₂-C₆H₄-4-Me | —CO₂Et | —CO₂Et |

TABLE 40

| —R¹ | —R² | —R³ | —R⁴ |
|---|---|---|---|
| (144) —NH₂ | —CONH₂ | —CO₂Et | —CO₂Et |
| (145) —NH₂ | —CN | —CO₂Et | —CO₂Et |
| (146) —NH₂ | —COMe | —CONHEt | —CONHEt |
| (147) —NH₂ | —COMe | —CONEt₂ | —CONEt₂ |
| (148) —NHCOMe | —Me | —CO₂Et | —CO₂Et |
| (149) —NHCOMe | —COMe | —CO₂Et | —CO₂Et |
| (150) —NHCOMe | —CONHSO₂—C₆H₄—Me | —CO₂Et | —CO₂Et |
| (151) —NHCOMe | —COMe —CN | —CN | |
| (152) —NHCOMe | —CONHSO₂—C₆H₄—Me | —CN | —CN |
| (153) —NH₂ | —COMe | —CN | —Ph |
| (154) —NH₂ | —COMe | —CO₂Et | —C₆H₄—Cl |
| (155) —NH₂ | —CONHSO₂—C₆H₄—Me | —CN | —Ph |
| (156) —NH₂ | —CONHSO₂—C₆H₄—Me | —CO₂Et | —C₆H₄—Cl |

TABLE 41

| —R¹ | —R² | —R³ | —R⁴ |
|---|---|---|---|
| (157) —(CH₂)₃CO₂H | —H | —Ph | —CN |
| (158) —(CH₂)₃CO₂H | —H | 2-Cl-C₆H₄— | —CN |
| (159) —(CH₂)₃CO₂H | —H | 3,4-Cl₂-C₆H₃— | —CO₂-(2,6-di-t-Bu-4-Me-cyclohexyl) |
| (160) —(CH₂)₃CO₂H | —H | —Ph | —SO₂Ph |
| (161) —(CH₂)₃CO₂Na | —H | —Ph | —CN |

TABLE 41-continued

| | —R¹ | —R² | —R³ | —R⁴ |
|---|---|---|---|---|
| (162) | —(CH₂)₃CO₂K | —H | 3,4-dichlorophenyl | 2,6-di-tert-butyl-4-methylcyclohexyl-CO₂— |
| (163) | —(CH₂)₃SO₃H | —H | —Ph | —CN |
| (164) | —(CH₂)₃SO₃H | —H | 2,3-dimethylphenyl | —CN |

TABLE 42

| | —R¹ | —R² | —R³ | —R⁴ |
|---|---|---|---|---|
| (165) | —(CH₂)₃SO₃H | —H | 4-chlorophenyl | —CO₂Et |
| (166) | —(CH₂)₃SO₃H | —H | —Ph | —SO₂Ph |
| (167) | —(CH₂)₃SO₃Na | —H | —Ph | —CN |
| (168) | —NHCO(CH₂)₂CO₂H | —H | —Ph | —CN |
| (169) | —NHCO(CH₂)₂CO₂H | —H | 3,4-dichlorophenyl | —CO₂Et |
| (170) | —NHCO(CH₂)₂CO₂H | —H | —Ph | —SO₂Ph |
| (171) | —NHCO(CH₂)₂CO₂H | —H | 3,4-dichlorophenyl | —CONH₂ |
| (172) | —NHCO(CH₂)₂CO₂Na | —H | —Ph | —CN |
| (173) | —NHCO(CH₂)₂CO₂Na | —H | 3,4-dichlorophenyl | —CO₂Et |

TABLE 43

| | —R¹ | —R² | —R³ | —R⁴ |
|---|---|---|---|---|
| (174) | —NHCO(CH₂)₂CO₂Na | —H | 3,4-dichlorophenyl | —CONH₂ |
| (175) | —NHCO(CH₂)₂SO₃H | —H | —Ph | —CN |
| (176) | —NHCO(CH₂)₂SO₃H | —H | 3,4-dichlorophenyl | —CO₂-(2,6-di-tert-butyl-4-methylcyclohexyl) |
| (177) | —NHCO(CH₂)₂SO₃H | —H | 3,4-dichlorophenyl | —CONH₂ |
| (178) | —NHCO(CH₂)₂SO₃Na | —H | —Ph | —CN |
| (179) | —NHCO(CH₂)₂SO₃K | —H | 3,4-dichlorophenyl | —CONH₂ |
| (180) | —NH₂ | —CO₂H | —Ph | —CN |
| (181) | —NH₂ | —CO₂H | 3,4-dichlorophenyl | —CO₂Et |

TABLE 44

| | —R¹ | —R² | —R³ | —R⁴ |
|---|---|---|---|---|
| (182) | —NH₂ | —CO₂H | 3,4-dichlorophenyl | —CONH₂ |
| (183) | —NH₂ | —CO₂Na | —Ph | —CN |
| (184) | —NH₂ | —CO₂K | 3,4-dichlorophenyl | —CONH₂ |
| (185) | —OEt | —CO₂H | —Ph | —CN |
| (186) | —OEt | —CO₂Na | —Ph | —CN |
| (187) | —Me | —CO₂H | —Ph | —CN |
| (188) | —Me | —CO₂K | —Ph | —CN |
| (189) | —NH₂ | —SO₃H | —Ph | —CN |
| (190) | —NH₂ | —SO₃H | —Ph | —CONH₂ |
| (191) | —NH₂ | —SO₃Na | —Ph | —CN |
| (192) | —NH₂ | —SO₃Na | 3,4-dichlorophenyl | —CONH₂ |

TABLE 45
| | —R$^1$ | —R$^2$ | —R$^3$ | —R$^4$ |
|---|---|---|---|---|
| (193) | —NHCO(CH$_2$)$_2$CO$_2$H | —CO$_2$H | 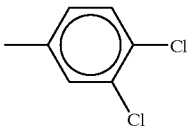 | 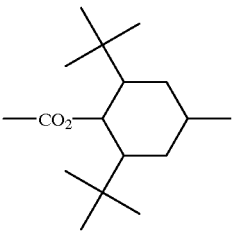 |
| (194) | —NHCO(CH$_2$)$_2$CO$_2$H | —CO$_2$H | —Ph | —CN |
| (195) | —NHCO(CH$_2$)$_2$CO$_2$Na | —CO$_2$Na | 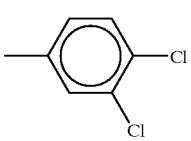 | —CO$_2$Et |
| (196) | —NHCO(CH$_2$)$_2$CO$_2$H | —H | —CN | —Ph |
| (197) | —NHCO(CH$_2$)$_2$SO$_3$H | —H | —CO$_2$Et | —CO$_2$Et |
| (198) | —Me | —H | 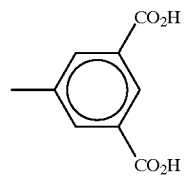 | —CN |
TABLE 46
| | —R$^1$ | —R$^2$ | —R$^3$ | —R$^4$ |
|---|---|---|---|---|
| (199) | —NH$_2$ | 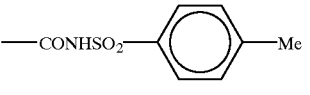 | 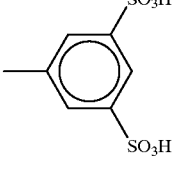 | —CN |
| (200) | —NH$_2$ | 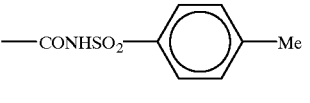 | 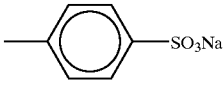 | —CN |
| (201) | —NH$_2$ | 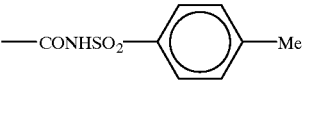 | —CO$_2$Na | —CO$_2$Et |
| (202) | 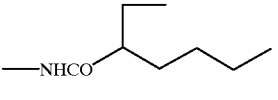 | —H | —Me | 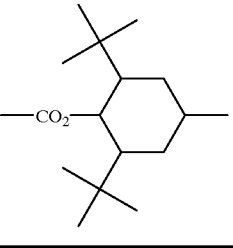 |

TABLE 47
For the
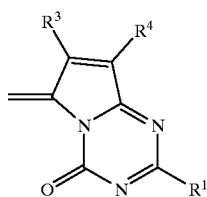
portion in general formula (I)
| | —$R^1$ | —$R^3$ | —$R^4$ |
|---|---|---|---|
| (203) | —H | —Ph | —CN |
| (204) | —Me | —Ph | —CN |
| (205) | —Me | —Ph | —$CO_2Et$ |
| (206) | —Me | —Ph | —$CO_2$-(2,6-di-tert-butyl-4-methylcyclohexyl) |
| (207) | —$CH_2CHCH_3$ \| $CH_3$ | —Ph | —CN |
| (208) | —$CH_2CHCH_3$ \| $CH_3$ | —Ph | —$CO_2$-(2,6-di-tert-butyl-4-methylcyclohexyl) |
| (209) | —$CH_2CHCH_3$ \| $CH_3$ | —$C_6H_4$-Cl (p) | —$CO_2$-(2,6-di-tert-butyl-4-methylcyclohexyl) |
| (210) | —$(CH_2)_3CO_2CH_2CHC_4H_9$ \| $C_2H_5$ | —$C_6H_4$-Cl (p) | —CN |
| (211) | —Cl | —$C_6H_3$(CH$_3$)-$OC_{14}H_{29}$(n) | —CN |

TABLE 47-continued
For the
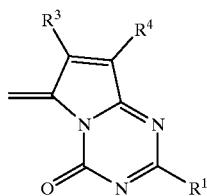
portion in general formula (I)
| | —R¹ | —R³ | —R⁴ |
|---|---|---|---|
| (212) | —Ph | —Ph | ![](cyclohexyl di-tert-butyl methyl CO₂ ester) |
| (213) | 4-(n-C₇H₁₅O)-C₆H₄— | —Ph | —CN |
TABLE 48
| | —R¹ | —R³ | —R⁴ |
|---|---|---|---|
| (214) | 3,4-Cl₂-C₆H₃— | 4-Cl-C₆H₄— | —SO₂-Ph |
| (215) | —OCH₃ | —Ph | —CN |
| (216) | —OCH₃ | —CN | —Ph |
| (217) | —OCH₃ | 4-Cl-C₆H₄— | —CO₂-(2,6-di-tert-butyl-4-methylcyclohexyl) |
| (218) | —OCH₂CH(C₂H₅)C₄H₉ | 3,4-Cl₂-C₆H₃— | —CO₂C₂H₅ |

TABLE 48-continued
| | —R¹ | —R³ | —R⁴ |
|---|---|---|---|
| (219) | —OCH₂CH₂OC₄H₉ | 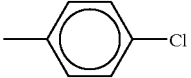 | 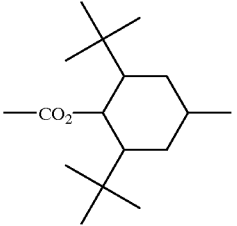 |
| (220) | —OCH₂CO₂C₂H₅ | —Ph | 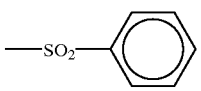 |
| (221) | —OCH₂CHC₄H₉<br>          \|<br>        C₂H₅ | 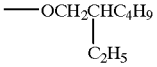 | —CONH₂ |
| (222) |  | 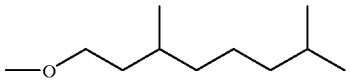 |  |
| (223) | 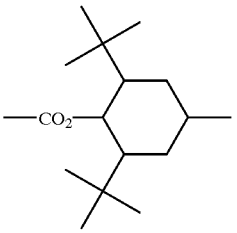 | 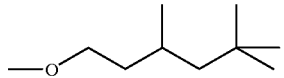 |  |
TABLE 49
| | —R¹ | —R³ | —R⁴ |
|---|---|---|---|
| (224) | —OC₄H₉ | —Ph | —CO₂C₂H₅ |
| (225) | —NH₂ | —Ph | —CN |
| (226) | —NHCOCH₃ | —Ph | —CN |
| (227) | 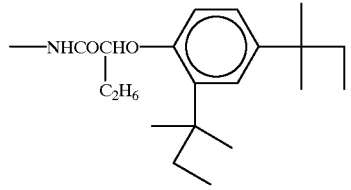 | —Ph | —CN |

TABLE 49-continued

| | —R¹ | —R³ | —R⁴ |
|---|---|---|---|
| (228) | —NHCOCH(C₂H₅)C₄H₉ | 4-Cl-C₆H₄— | —CO₂-(2,6-di-t-butyl-4-methylcyclohexyl) |
| (229) | —NHCOCH₃ | 3,4-di-Cl-C₆H₃— | —CO₂-(2,6-di-t-butyl-4-methylcyclohexyl) |
| (230) | —NHCO-(2-Cl-C₆H₄) | —Ph | —CO₂C₂H₅ |
| (231) | —NHSO₂-(4-CH₃-C₆H₄) | —Ph | —CN |
| (232) | —NHCONH-cyclohexyl | —Ph | —CN |
| (233) | —NHCO₂CH₃ | —Ph | —CN |
| (234) | —SCH₃ | —Ph | —CN |
| (235) | —S—CH₂-(branched alkyl) | —Ph | —CN |

TABLE 50

| | —R¹ | —R³ | —R⁴ |
|---|---|---|---|
| (236) | —SCH₂CH(C₂H₅)C₄H₉ | —Ph | —CO₂-(2,6-di-t-butyl-4-methylcyclohexyl) |
| (237) | —SC₄H₉ | —CON(C₄H₉)₂ | —CON(C₄H₉)₂ |

TABLE 50-continued

| | —R¹ | —R³ | —R⁴ |
|---|---|---|---|
| (238) | —SC₁₂H₂₅ | —CO₂C₂H₅ | 4-chlorophenyl |
| (239) | —SCH₂CHC₄H₉ (with C₂H₅ branch) | —CH₃ | 2,6-di-tert-butyl-4-methylcyclohexyl —CO₂— |
| (240) | —SCH₂CHC₄H₉ (with C₂H₅ branch) | 3,4-dichlorophenyl | 2,6-di-tert-butyl-4-methylcyclohexyl —CO₂— |
| (241) | —SCH₂CHC₄H₉ (with C₂H₅ branch) | 4-chlorophenyl | —CO₂C₂H₅ |
| (242) | branched alkyl-S-CH₂— | —Ph | —SO₂-(4-methylphenyl) |
| (243) | —SCH₂CHC₄H₉ (with C₂H₅ branch) | —Ph | —CON(C₄H₉)₂ |
| (244) | —SC₄H₉ | —CO₂C₄H₉ | —CO₂C₄H₉ |
| (245) | —SCH₂CO₂C₂H₅ | —CN | —Ph |
| (246) | —SC₈H₁₇ | —Ph | —Ph |
| (247) | —SO₂CH₃ | —Ph | —CN |

TABLE 51

| | —R¹ | —R³ | —R⁴ |
|---|---|---|---|
| (248) | —CO₂C₂H₆ | 2-methylphenyl (H₃C substituent) | —CN |
| (249) | —OH | 3-(NHCOCH₃)phenyl | —CN |
| (250) | —(CH₂)₃CO₂H | —Ph | —CN |

TABLE 51-continued

| | —R¹ | —R³ | —R⁴ |
|---|---|---|---|
| (251) | —(CH₂)₃CO₂H | 4-HO-C₆H₄— | —CN |
| (252) | —(CH₂)₃CO₂Na | 4-Cl-C₆H₄— | —CN |
| (253) | —(CH₂)₃CO₂K | 4-Cl-C₆H₄— | —CN |
| (254) | —(CH₂)₃SO₃H | —CH₃ | —CN |
| (255) | —(CH₂)₃SO₃K | —Ph | —CO₂C₂H₅ |
| (256) | —CH₂CO₂K | —Ph | —CONH₂ |
| (257) | 3-(KO₂C)-C₆H₄— | 3-(KO₂C)-C₆H₄— | —CN |
| (258) | 3-(KO₃S)-C₆H₄— | —CN | —Ph |
| (259) | 4-(KO₂CCH₂O)-C₆H₄— | —Ph | —CN |
| (260) | 4-(KO₂SCH₂O)-C₆H₄— | —Ph | —CN |

TABLE 52

| | —R¹ | —R³ | —R⁴ |
|---|---|---|---|
| (261) | —NH₂ | 3-(KO₂S)-C₆H₄— | —CN |
| (262) | —NHCOCH₃ | 3-(NaO₂C)-C₆H₄— | —CN |
| (263) | —NHCO(CH₂)₂CO₂K | —Ph | —CN |
| (264) | —NHCO(CH₂)₂SO₃K | 3-(KO₂C)-C₆H₄— | —CN |

TABLE 52-continued

| | —R¹ | —R³ | —R⁴ |
|---|---|---|---|
| (265) | —OH | 3-methylbenzenesulfonate (—C₆H₃(CH₃)SO₂K) | —CN |
| (266) | —OCH₃ | 3,5-disulfo-methylbenzene (—C₆H₂(CH₃)(SO₃K)₂) | —CN |
| (267) | —O(CH₂)₂O(CH₂)₂OCH₃ | 4-sulfo-methylbenzene (—C₆H₃(CH₃)SO₃K) | —CN |
| (268) | —OCH₂CO₂H | 3,5-dicarboxy-methylbenzene (—C₆H₂(CH₃)(CO₂H)₂) | —CN |
| (269) | —OCH₂CO₂K | 4-carboxy-methylbenzene (—C₆H₃(CH₃)CO₂K) | —CONH₂ |
| (270) | —OCH₂SO₃K | 4-sulfo-methylbenzene (—C₆H₃(CH₃)SO₃K) | —CN |

TABLE 53

| | —R¹ | —R³ | —R⁴ |
|---|---|---|---|
| (271) | —OCH₂CHOH(CH₃) | 4-carboxy-methylbenzene (—C₆H₃(CH₃)CO₂K) | —CN |
| (272) | —SH | 3,5-dicarboxy-methylbenzene (—C₆H₂(CH₃)(CO₂H)₂) | —CN |
| (273) | —SCH₃ | 4-sulfo-methylbenzene (—C₆H₃(CH₃)SO₃K) | —CN |
| (274) | —SK | —Ph | —CN |
| (275) | —SCH₂CO₂K | —Ph | —CN |
| (276) | —SCH₂SO₃K | —Ph | —CN |
| (277) | —S(CH₂)₃CO₂K | 3,5-dicarboxy-methylbenzene (—C₆H₂(CH₃)(CO₂K)₂) | —CN |
| (278) | —SCH₂SO₃K | —CN | —Ph |

EXAMPLES

Hereinafter, specific dye compounds of the present invention will be described as Examples, but the present invention is not to be limited to these Examples.

The dye compounds of the present invention are expressed as a combination of an Ar portion and a coupler portion represented by the following formula. For example, the exemplified Compound 2-(1) means a combination of the Ar portion (diazo portion) represented by the number 2 in Table 1, and the coupler portion represented by (1) in Table 22. Namely, the dye compound represented by 2-(1)

has the following structure. Note that the numbers next to the Example numbers represent the combination of the Ar portion and the coupler portion of the dye compound synthesized in that Example.

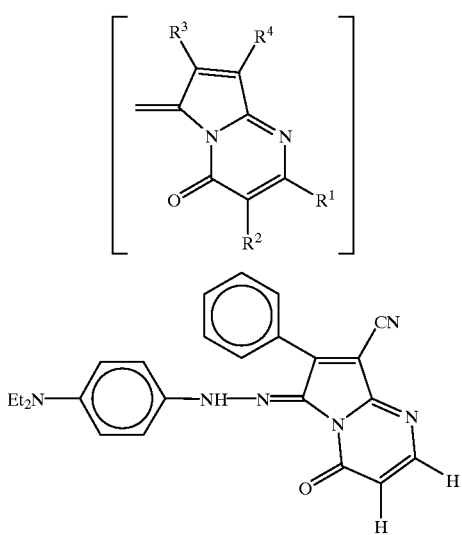

Further, the UV data in the following examples was measured with a mixed solvent of chloroform and methanol in a 1-to-1 ratio (volume ratio).

Example 1

The specific compound 60-(5) was synthesized in accordance with the following process.

Synthesis of Ar Portion

1: 2-n-dodecylthio-4-chloronitrobenzene was synthesized in accordance with the following reaction formula.

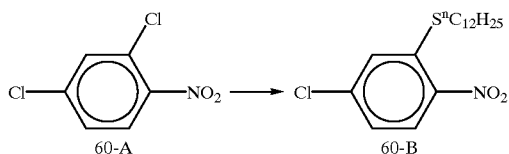

23 g of a methanol solution which was 28% sodium methoxide was added dropwise at room temperature to 150 ml of a methanol solution containing 19.2 g of 2,4-dicyclonitrobenzene and 20.1 g of n-dodecylmercaptane, and a reaction was carried out for three hours at an internal temperature of 35° C. 450 ml of water was added to the reaction solution. The precipitated crystals were filtered, and recrystallized with methanol, and 28.7 g of 2-n-dodecylthio-4 -chloronitrobenzene was obtained as light yellow crystals.

1H-NMR (CDCl$_3$, δ, TMS reference) 0.90 (3H, t) 1.23–1.40 (16H, m) 1.52 (2H, qr) 1.76 (2H, qr) 2.94 (2H, t) 7.19 (1H, dd) 7.34 (1H, d) 8.18 (1H, d)

2: 2-n-dodecylsulfonyl-4-chloronitrobenzene was synthesized in accordance with the following reaction formula.

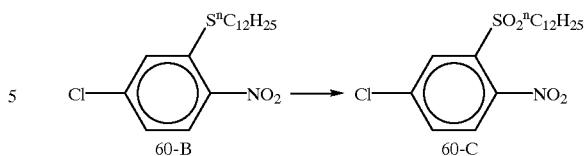

0.2 g of tungsten acid sodium salt (II) hydrate was added to 40 ml of an acetic acid solution in which 17.9 g of 2-n-dodecylthio-4 -chloronitrobenzene was mixed, and 12.5 g of a 30% hydrogen peroxide water was added dropwise at an internal temperature of 70° C, and a reaction was carried out at that same temperature over three hours. The reaction solution was cooled to room temperature, and 120 ml of water was added. The precipitated crystals were filtered, washed with water and dried, and 19.5 g of 2-n-dodecylsulfonyl-4-chloronitrobenzene was obtained as a slightly yellow crystal.

1H-NMR (CDCl$_3$, δ, TMS reference) 0.88 (3H, t) 1.22–1.35 (16H, m) 1.44 (2H, qr) 1.83 (2H, qr) 3.58 (2H, m) 7.76 (2H, d) 7.83 (2H, d) 8.23 (2H, d)

3: 2-n-dodecylsulfonyl-4-dimethylaminonitrobenzene was synthesized in accordance with the following reaction formula.

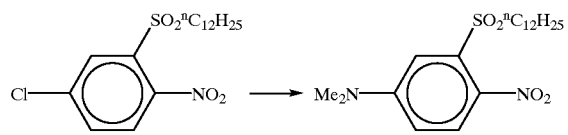

4.5 g of a 40% dimethylamine aqueous solution was added dropwise at an internal temperature of 65° C. to a solution in which 9.8 g of 2-n-dodecylsulfonyl-4-chloronitrobenzene and 5.2 g of potassium carbonate were mixed with 25 ml of DMAc (N,N-dimethylacetoamide), and a reaction was conducted over two hours at an internal temperature of 80° C. 100 ml of water was added to the reaction solution. The precipitated crystals were filtered out and were recrystallized with methanol, such that 8.4 g of 2-n-dodecylsulfonyl-4-dimethylaminonitrobenzene was obtained as a yellow crystal.

1H-NMR (CDCl$_3$, δ, TMS reference) 0.89 (3H, t) 1.22–1.38 (16H, m) 1.45 (2H, qr) 1.84 (2H, qn) 3.17 (6H, s) 3.72 (2H, t) 6.74 (1H, dd) 7.42 (1H, d) 8.02 (1H, d)

4: After 2-n-dodecylsulfonyl-4-dimethylaminonitrobenzene was reduced and an amino body was obtained in accordance with the following reaction formula, the amino body was diazoized to obtain diazonium salt 60.

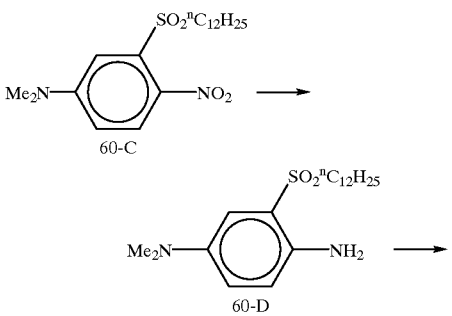

-continued

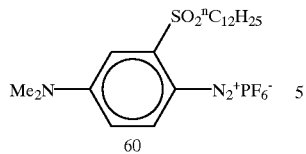

4.0 g of 2-n-dodecylsulfonyl-4-dimethylaminonitrobenzene was added slowly by drops at an internal temperature of 80° C. to a mixed solution formed from 2.8 g of iron powder, 0.1 g of ammonium chloride, 1 ml of water, and 20 ml of isopropyl alcohol.

After thermal reflux was carried out for two hours, the reaction solution was Celite filtered. The filtrate was vacuum concentrated and an amino body was obtained. The amino body was dissolved in 20 ml of methanol, and while being cooled, 5.0 g of ice-cooled hydrochloric acid was added in drops thereto.

The substance was cooled to an internal temperature of 5° C. or less, and a solution containing 0.7 g of sodium nitrite and 1.5 ml of water was slowly added dropwise thereto, and the resulting product was stirred for 30 minutes at an internal temperature of 0 to 5° C. 2.5 g of $KPF_6$ was added, and the mixture was stirred for 30 minutes at an internal temperature of 30° C. The reaction solution was cooled to 0° C., and mixed for one hour. Thereafter, the solution was filtered and the filtered substance was dried. The obtained precipitate was dissolved in 20 ml of ethyl acetate. 15 ml of water was added and liquid separation was carried out twice. The organic layer was vacuum dried at a bath temperature of 30° C., and the obtained rough crystal was recrystallized with isopropyl alcohol such that 3.8 g of diazonium salt 60 was obtained as a yellow crystal.

1H-NMR (CDCl$_3$, δ, TMS reference) 0.87 (3H, t) 1.21–1.37 (16H, m) 1.45 (2H, qr) 1.82 (2H, qr) 3.50–3.60 (8H, m) 7.11 (1H, dd) 7.28 (1H, d) 8.16 (1H, d)

Synthesis of Coupler Portion

5: 2-amino-3-cyano-4-phenylpropyl was synthesized in accordance with the following reaction formula. (The reaction in accordance with this formula is known, and therefore explanation thereof will be omitted.)

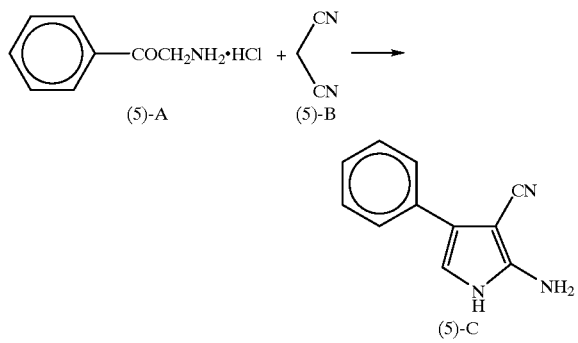

6: The coupler portion (5) was synthesized in accordance with the following reaction formula.

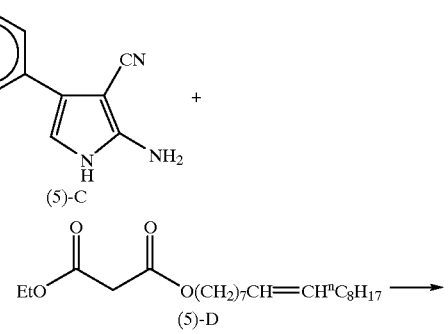

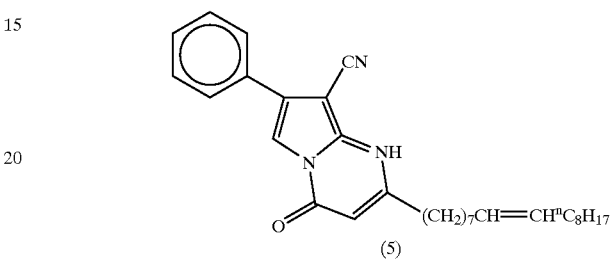

18.3 g of 2-amino-3-cyano4-phenylpyrol, 35.2 g of the compound expressed by (5)-D in the above formula, and 15.5 g of ammonium acetate were suspended in 100 ml of toluene, and a reaction was carried out for 5 hours while water was removed at an internal temperature of 130° C. After 100 ml of ethyl acetate was added to the reaction solution at room temperature, 200 ml of water was added and the solution was separated. The rough crystal obtained by concentrating the organic layer was recrystallized by acetonitrile, and 31.5 g of a coupler portion (5) was obtained as a white crystal.

1H-NMR (CDCl$_3$, δ, TMS reference) 0.85 (3H, t) 1.02–1.43 (20H, m) 1.73 (2H, rn) 1.90–2.03 (4H, m) 2.59 (2H, t) 5.38 (2H, m) 5.69 (1H, s) 7.35–7.51 (3H, m) 7.56 (1H, s) 7.73 (2H, d)

Synthesis of Azo Dye

7: An azo dye was synthesized in accordance with the following reaction formula.

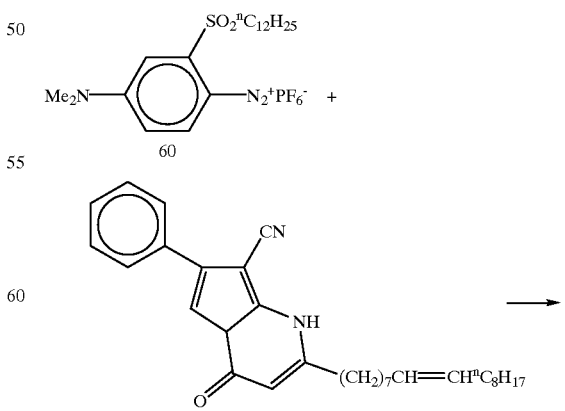

99

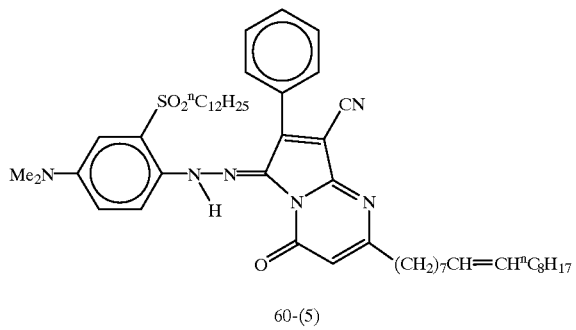

60-(5)

0.3 g of triethylamine was added to a solution containing 20 ml of methanol and 0.94 g of the coupler portion (5) obtained in the above process number 6. 1.05 g of the diazonium salt 60 in the reaction formula of above process number 4 was slowly added thereto at room temperature. Stirring was carried out for 30 minutes at the same temperature, and the precipitated crystals were filtered and washed with warm water of 40° C. The rough crystals were recrystallized with methanol, and 1.32 g of the azo dye 60-(5) shown by the above formula was obtained.

1H-NMR (CDCl$_3$, δ, TMS reference) 0.88 (6H, m) 1.19–1.45 (38H, m) 1.70–1.83 (4H, m) 2.02 (4H, m) 2.63 (2H, t) 3.03 (6H, s) 3.26 (2H, m) 5.35–5.43 (2H, m) 6.23 (1H, s) 6.87 (1H, d) 7.18 (1H, d) 7.48 (1H, d) 6.99 (3H, m) 7.84 (2H, d) 13.78 (1H, s)

UV (λmax, ε) 588 nm (27800)

The structure of dye 60-(5) was determined to be a hydrazone structure due to the $^{15}$N-label dye. The $^{15}$N-label dye was synthesized by using a structure in which, in the diazo portion 60, the a position nitrogen atom of the diazonio group was labeled with $^{15}$N. After 60-A was obtained by nitrolyzing m-dichlorobenzene by a usual method with H$^{15}$NO$_3$ (a $^{15}$N labeled compound of nitric acid), the $^{15}$N labeled compound was introduced into 60 in the same manner as the method described above, and was coupled with (5) to as to result in the dye. The 60-(5)-$^{15}$N labeled body had the following structural formula.

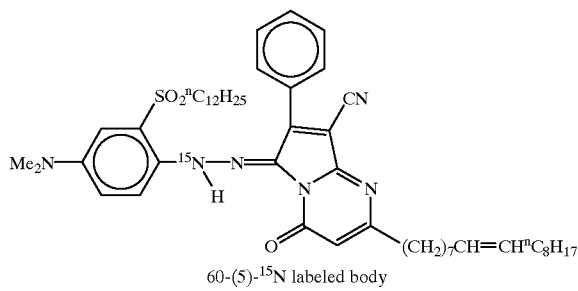

60-(5)-$^{15}$N labeled body

In the 60-(5)-$^{15}$N labeled body, the hydrazone proton bonded to the $^{15}$N was observed as a doublet by the correlation with the $^{15}$N at 13.78 ppm as measured by $^1$-NMR measurement. The $^{15}$N atom was observed only at −194.8 ppm when the $^1$H-NMR measurement was conducted. From these results, it was concluded that 99% or more of 60-(5) has a hydrazone structure.

100

Example 2

The dye 32-(5) was synthesized in accordance with the following process.

Synthesis of Ar Portion

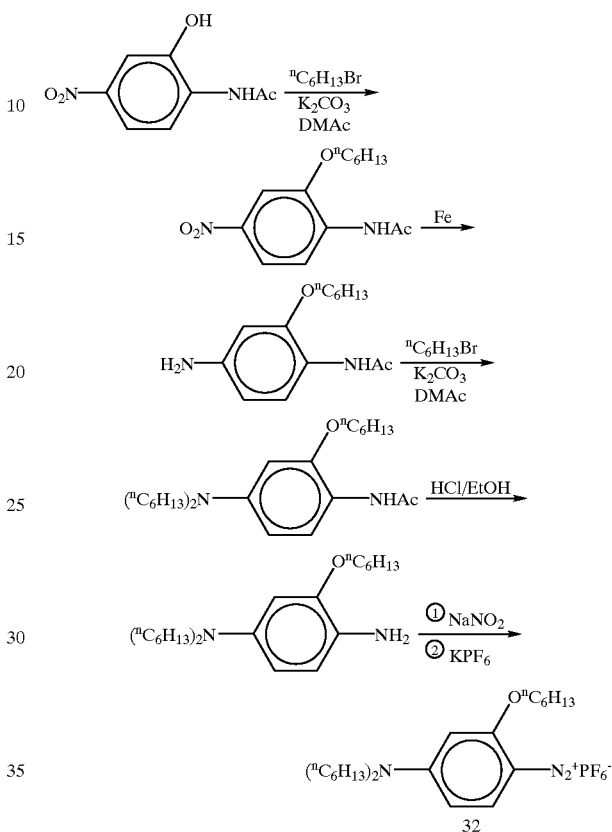

Synthesis of Dye 32 and (5) were azo coupled under a basic condition in the same way as in Example 1, and 32-(5) was obtained.

UV (λmax, ε) 698 nm (35, 200)

Example 3

The dye 34-(5) was synthesized in the same manner as in Example 1.

1H-NMR (CDCl$_3$, δ, TMS reference) 0.84–0.99 (9H, m) 1.23–1.41 (28H, m) 1.45–1.60 (2H, m) 1.68–1.80 (2H, m) 1.89 (2H, qr) 2.01 (2H, m) 2.62 (2H, t) 3.24 (2H, m) 3.77 (3H, s) 3.88 (1H, m) 4.01 (3H, m) 4.26 (1H, m) 5.26 (2H, m) 6.01 (1H, s) 6.28 (1H, s) 6.36 (1H, dd) 6.77–6.83 (4H, m) 7.22 (1H, d) 7.51–7.60 (3H, m) 7.83 (2H, m) 15.50 (1H, s)

UV (λmax, ε) 666 nm (38000)

Example 4

The dye 36-(5) was synthesized in the same manner as in Example 1.

1H-NMR (CDCl$_3$, δ, TMS reference) 0.83–1.02 (21H, m) 1.20–1.42 (20H, m) 1.44–1.66 (12H, m) 1.68–1.83 (4H, m) 1.93–2.07 (4H, m) 2.23 (4H, t) 2.36 (4H, t) 2.58 (2H, t) 4.09 (1H, t) 4.21 (4H, s) 5.38 (2H, m) 5.97–6.08 (3H, m) 7.17 (1H, d) 7.54 (3H, m) 7.82 (2H, m) 14.97 (1H, s)

UV (λmax, ε) 633 nm (38000)

Example 5

The dye 94-(5) was synthesized in the same manner as in Example 1.

UV ($\lambda$max, $\epsilon$) 615 nm (29800)

Example 6

The dye 305-(5) was synthesized in the same manner as in Example 1.

UV ($\lambda$max, $\epsilon$) 591 nm (28400)

Example 7

The dye 39-(5) was synthesized in the same manner as in Example 1.

UV ($\lambda$max, $\epsilon$) 655 nm (38700)

Example 8

Synthesis of Coupler Portion

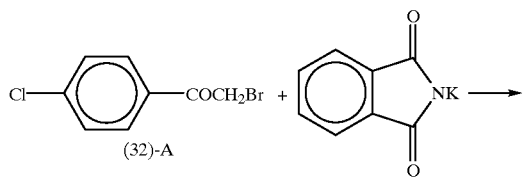

1: 20 g of potassium phthalimide salt was added at ordinary temperature to a solution containing 150 ml of DMF and 23.4 g of 4'-chlorophenacylbromide, and reaction was carried out for one hour at 40° C.

Water was added to the reaction solution, and the precipitated crystals were filtered and washed with methanol so as to obtain 28.5 g of (32)-B as a white crystal.

$^1$-NMR (CDCl$_3$, $\delta$, TMS reference) 5.09 (2H, s) 7.51 (2H, d) 7.76 (2H, m) 7.87–7.97 (4H, m)

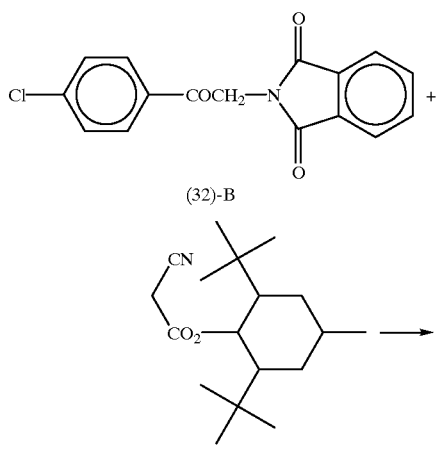

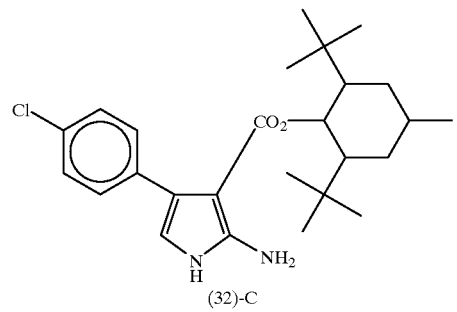

2: 24.0 g of (32)-B in the above formula and 23.5 g of 2,6-di-t-butyl-4-methyl-cyclohexylester of cyanoacetic acid were suspended in 200 ml of ethanol, and 31 g of a 48% sodium hydroxide aqueous solution was added dropwise thereto at room temperature. Thereafter, thermal reflux was carried out for 2 hours.

One liter of water was added to the reaction solution at an internal temperature of 40° C. The precipitated crystals were filtered, washed with water and dried so as to obtain 32.3 g of (32)-C as a pale pink colored crystal.

$^1$-NMR (CDCl$_3$+1 drop DMSOd$_6$, $\delta$ value, TMS reference) 1.47–1.58 (3H, m) 1.72–1.88 (21H, m) 0.96–1.08 (2H, m) 1.25–1.35 (3H, m) 5.33 (2H, br-s) 5.86 (1H, s) 6.05 (1H, s) 7.23–7.33 (4H, m) 7.64 (1H, br-s)

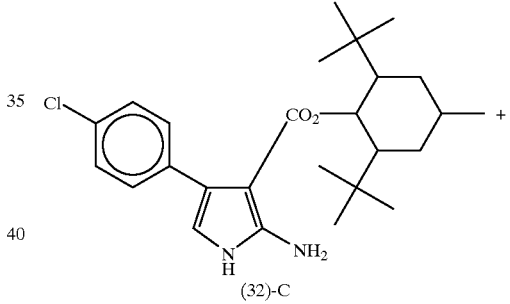

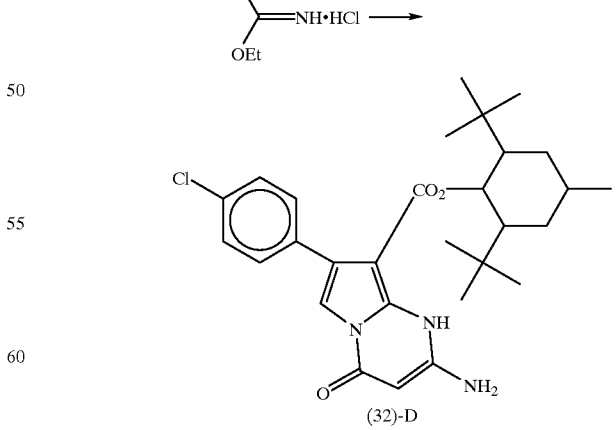

3: 22.3 g of (32)-C in the above formula and 9.8 g of potassium acetate were suspended in 50 ml of ethanol, and a solution in which 10 g of iminoethyl was dissolved in 50 ml of ethanol was added dropwise at room temperature. After mixing for 24 hours at room temperature, 300 ml of water was added to the reaction solution. The precipitated crystals were filtered and washed with ethanol, and 20.1 g of (32)-D was obtained as a white crystal.

$^1$-NMR (CDCl$_3$+1 drop DMSOd$_6$, δ value, TMS reference) 0.52 (q, 2H) 0.77 (d, 3H) 0.82 (s, 18H) 1.03 (dd, 2H) 1.28 (m, 3H) 5.01 (d, 1H) 5.83 (s, 1H) 6.00 (br-s, 2H) 7.04 (s, 1H) 7.31 (m, 4H)

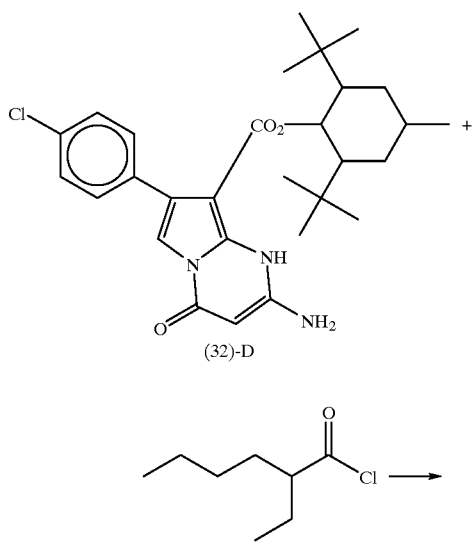

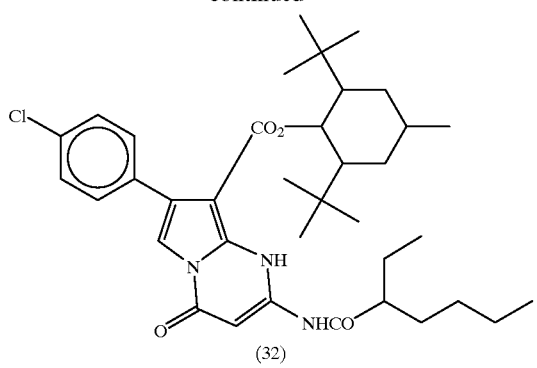

(32)

4: 15.4 g of (32)-D in the above formula and 6.1 g of triethylamine were suspended in 30 ml of acetonitrile, and 0.7 g of 4-dimethylaminopyridine and 5.1 g of 2-ethylhexanate chloride were added successively at room temperature. Stirring was conducted for three hours at that same temperature, and the reaction solution was added to 100 ml of 1N hydrochloric acid.

The precipitated crystals were filtered, and recrystallized with ethanol, such that 13.5 g of (32) was obtained as a white crystal.

$^1$-NMR (CDCl$_3$, δ value, TMS reference) 0.52 (q, 2H) 0.80 (t, 3H) 0.84 (s, 21H) 0.94 (t, 3H) 1.04 (dd, 2H) 1.24–1.36 (m, 7H) 1.55 (m, 2H) 1.76 (m, 2H) 2.37 (m, 1H) 5.53 (d, 1H) 5.97 (s, 1H) 7.12 (s, 1H) 7.31 (d, 2H) 7.38 (d, 2H) 9.74 (brs, 1H)

Synthesis of Dye

The diazonium salt, which is shown by following formula 31 and which was synthesized in the same manner as in Example 2, was used in the azo coupling reaction.

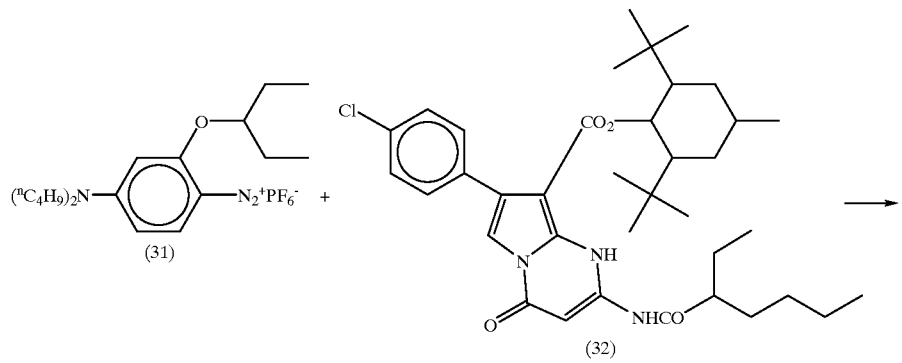

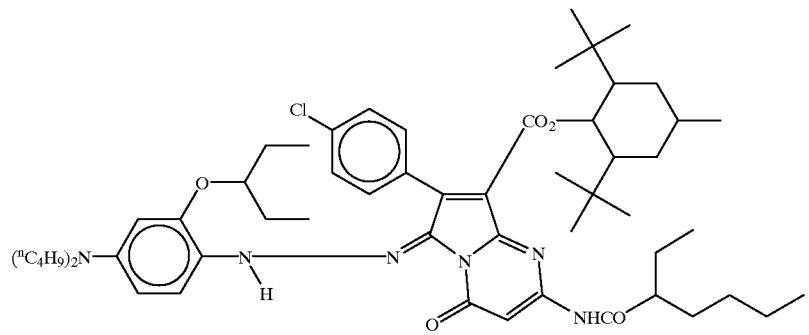

0.3 g of triethylamine was added to a solution containing 10 ml of ethyl acetate and 1.26 g of (32) in the above formula. 0.93 g of the diazonium salt 31 was added slowly thereto at room temperature.

Stirring was carried out for one hour at that same temperature, and 50 ml of ethyl acetate and 100 ml of water were added. After 20 ml of 1N diluted hydrochloric acid was added and the solution was neutralized, the solution was dispersed. The organic layer was vacuum precipitated, and recrystallized with methanol so as to obtain 1.51 g of dye 31-(32).

$^1$-NMR (CDCl$_3$, δ value, TMS reference) 0.84–1.03 (43H, m) 1.13 (2H, m) 1.24–1.66 (20H, m) 1.66–1.84 (4H, m) 2.16 (1H, m) 3.25 (4H, t) 4.10 (1H, m) 5.89 (1H, s) 6.08 (1H, d) 6.14 (1H, d) 6.87 (1H, d) 7.16 (1H, s) 7.36 (2H, d) 7.45 (2H, d) 7.96 (1H, s) 15.24 (1H, s)

UV (λmax, ε) 663 nm (44300)

Example 9
Synthesis of Coupler Portion

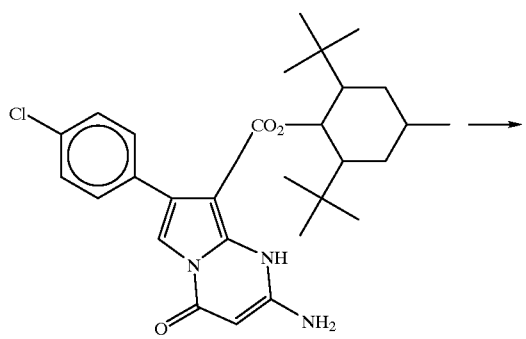

(32)-D

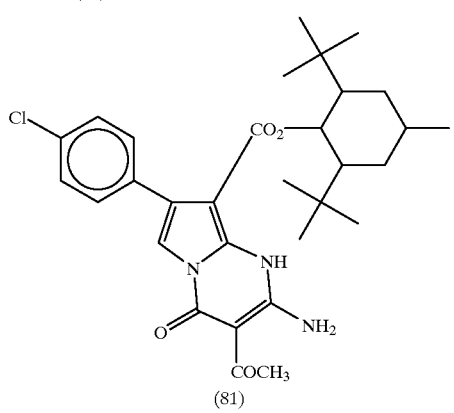

(81)

5.12 g of (32)-D of Example 8 was dissolved in 20 ml of THF, and 3.9 g of acetylchloride was added thereto in drops. After this dropwise addition had been completed, thermal reflux was carried out for 5 hours. The reaction solution was poured into 100 ml of ice water, and placed in a 3N sodium hydroxide aqueous solution so as to process the excess acetylchloride. Thereafter, the solution was made acidic with 2N hydrochloric acid water, and the precipitated crystals were filtered. The rough crystals were recrystallized with ethanol, and 3.87 g of (81) was obtained.

Synthesis of Dye

Diazonium salt 31 was azo coupled with above (81) in the same way as in Example 8, so as to obtain dye 31-(81).
$^1$H-NMR (CDCl$_3$, δ value, TMS reference) 0.86 (18H, s) 0.87–1.03 (15H, m) 1.08–1.21 (4H, m) 1.22–1.64 (10H, m) 1.68–1.84 (4H, m) 2.06 (1H, s) 2.72 (4H, m) 4.26 (1H, m) 5.87 (2H, m) 6.10 (1H, d) 6.19 (1H, dd) 6.90 (2H, d) 7.28 (2H, d) 7.42 (2H, d) 9.98 (1H, br-s) 14.73 (1H, s)

UV (λmax, ε) 649 nm (42000)

Example 10
Synthesis of Coupler Portion

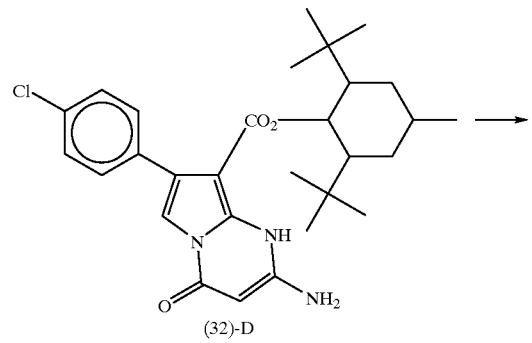

(32)-D

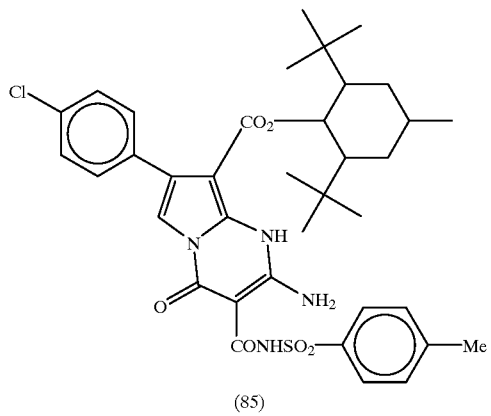

(85)

5.12 g of 32-(D) in Example 8 was suspended in 20 ml of acetonitrile, and 1.97 g of p-toluenesulfonylisocyanate was added dropwise at room temperature. Reaction was carried out for one hour at the same temperature, and the reaction solution was poured into 100 ml of water. The solution was made weakly acidic by 1N hydrochloric acid.

The precipitated crystals were filtered, and recrystallized with ethanol so as to obtain 6.02 g of (85).

Synthesis of Dye

The diazonium salt 31 and above (85) were azo coupled in the same way as in Example 8 so as to obtain dye 31-(85).
$^1$-NMR (CDCl$_3$, δ value, TMS reference) 0.85 (18H, s) 0.87–1.18 (19H, m) 1.22–1.62 (10H, m) 1.84–2.00 (4H, m) 2.43 (3H, s) 3.22–3.37 (4H, t) 4.20 (1H, m) 5.89–5.92 (2H, m 6.15–6.21 (2H, m) 6.89 (1H, d) 7.30–7.37 (4H, m) 7.46 (2H, d) 7.98 (2H, d) 9.29 (1H, br-s) 12.28 (1H, s) 14.18 (1H, s)

UV (λmax, ε) 664 nm (43600)

Example 11

Dye 34-(85) was synthesized in the same way as in Example 10.

UV (λmax, ε) 643 nm (34300)

Example 12

Dye 39-(85) was synthesized in the same way as in Example 10.

UV (λmax, ε) 650 nm (45400)

Example 13

Dye 36-(85) was synthesized in the same way as in Example 10.

UV ($\lambda$max, $\epsilon$) 612 nm (37900)

Example 14

A diazonium salt (azo portion 1) was synthesized by N,N-dimethyl-p-phenylenediamine by a usual method. Thereafter, this diazonium salt was azo coupled with (5) in Example 1 so as to obtain 1-(5).

UV ($\lambda$max, $\epsilon$) 648 nm (41000)

Example 15

Dye 4-(5) was synthesized in the same way as in Example 1.

UV ($\lambda$max, $\epsilon$) 652 nm (41100)

Example 16 m-nitrofluorobenzene was aminized with 1-amino-1,2,4-triazole by a usual method so as to obtain 2-fluoro4-nitroaniline. This was protected with an acetyl group, and was unprotected by using, as a dimethylamino group, an amino group obtained by reducing the nitro group, so as to obtain 2-fluoro-4-dimethylaminoaniline. This aniline was diazoized (azo portion 15), and the resultant structure was azo coupled with (5) in Example 1 so as to obtain 15-(5).

UV ($\lambda$max) 650 nm

Example 17

Dye 19-(5) was obtained in the same way as in Example 14.

UV ($\lambda$max) 668 nm

Example 18

3,5-dimethoxyaniline was bromided with n-hexylbromide so as to obtain 1-di-n-hexylamino-3,5-dimethoxybenzene. This was nitrosoized so as to obtain 1-di-n-hexylamino-3,5-dimethoxy-4-nitrobenzene.

The amino body obtained by reducing the nitroso body with iron powder was diazoized so as to obtain a diazonium salt (diazo portion 83). Thereafter, this was azo coupled with (5) in Example 1 so as to obtain dye 83-(5).

UV ($\lambda$max, $\epsilon$) 664 nm (35600)

Example 19

Orcinol (5-resorcinol) was aminized by di-n-hexylamine, so as to obtain 1-di-n-hexylamino-3-methyl-5-hydroxybenzene. The hydroxy group thereof was etherized with methyl iodide, and then nitrosoized so as to obtain 1-di-n-hexylamino-3-methyl-4-nitroso-5-methoxybenzene.

The amino body obtained by reducing the nitroso body with iron powder was diazoized so as to obtain a diazonium salt (diazo portion 82). Thereafter, this diazonium salt was azo coupled with (5) of Example 1, so as to obtain dye 82-(5).

UV ($\lambda$max) 671 nm

Example 20

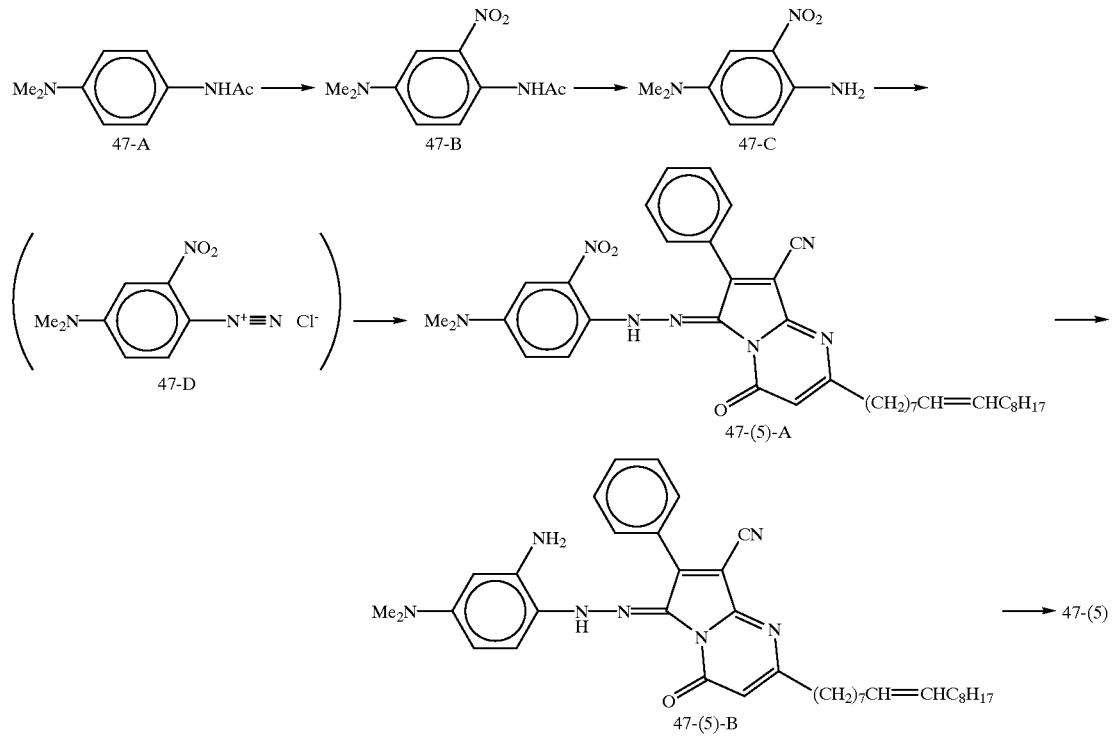

Above 47-A was nitroized with potassium nitrate so as to obtain 47-B. After 47-B was hydrolisized and diazoized, the methanol aqueous solution of 47-D was obtained. 47-(D) and (5) were azo coupled so as to obtain 47-(5)-A. 47-(5)-B, which was obtained by reducing 47-(5)-A with sodium hydroxide, was acetylized with acetic anhydride/pyridine, so as to obtain 47-(5).

UV ($\lambda$max) 655 nm

Example 21

Dye 106-(5) was obtained in the same way as in Example 20.

UV ($\lambda$max) 629 nm

Example 22

Dye 80-(5) was obtained in the same way as in Example 2.

UV ($\lambda$max, $\epsilon$) 669 nm (32100)

Example 23

Dye 288-(5) was obtained in the same way as in Example 1.

UV ($\lambda$max, $\epsilon$) 574 nm (29200)

Example 24

Dye 299-(5) was obtained in the same way as in Example 1.

UV ($\lambda$max, $\epsilon$) 539 nm (31300)

Example 25

Dye 28-(5) was obtained in the same way as in Example 2.

UV ($\lambda$max, $\epsilon$) 690 nm

Example 26

In the same way as in Example 1, (10) was obtained, and dye 33-(10) was synthesized.

UV ($\lambda$max) 661 nm

Example 27

In the same way as in Example 26, 35-(12) was synthesized.

UV ($\lambda$max) 684 nm

Example 28

In the same way as in Example 26, 35-(18) was synthesized.

UV ($\lambda$max) 654 nm

Example 29

In the same way as in Example 26, 35-(17) was synthesized.

UV ($\lambda$max) 669 nm

Example 30

In the same way as in Example 26, 35-(22) was synthesized.

UV ($\lambda$max) 672 nm

Example 31

In the same way as in Example 2, the Ar portion 36 was obtained. In the same way as in Example 26, the coupler portion (20) was obtained. The dye was synthesized from these.

UV ($\lambda$max) 656 nm

Example 32

In the same way as in Example 31, 36-(13) was synthesized.

UV ($\lambda$max) 652 nm

Example 33

In the same way as in Example 31, 36-(14) was synthesized.

UV ($\lambda$max) 658 nm

Example 34

(36) was obtained in the same way as in Example 8, and dye 35-(36) was synthesized.

UV ($\lambda$max) 680 nm

Example 35

(39) was obtained in the same way as in Example 8, and dye 32-(39) was synthesized.

UV ($\lambda$max, $\epsilon$) 668 nm (40900)

Example 36

In the same way as in Example 35, dye 35-(44) was synthesized.

UV ($\lambda$max, $\epsilon$) 671 nm (34700)

Example 37

In the same way as in Example 35, dye 35-(46) was synthesized. ($\lambda$max, $\epsilon$) 641 nm (35700)

Example 38

(56) was obtained in the same way as in Example 1, and dye 35-(56) was synthesized.

UV ($\lambda$max) 647 nm

Example 39

In the same way as in Example 38, dye 35-(58) was synthesized.

UV ($\lambda$max) 694 nm

Example 40

In the same way as in Example 38, dye 35-(60) was synthesized.

UV ($\lambda$max) 680 nm

Example 41

In the same way as in Example 38, dye 35-(57) was synthesized.

UV ($\lambda$max) 694 nm

Example 42

(69) was obtained in the same way as in Example 8, and dye 32-(69) was synthesized.

UV ($\lambda$max) 627 nm

Example 43

In the same way as in Example 42, dye 32-(71) was synthesized.

UV ($\lambda$max) 638 nm

Example 44

(32)-D in Example 8 was reacted with chlorosulfonyliso-cyanate. The reaction product was water treated so as to obtain (88), and dye 32-(88) was synthesized.

UV (λmax, ε) 642 nm (46000)

Example 45

(88) of Example 44 was treated with phosphorus oxychloride so as to obtain (89), and dye 32-(89) was synthesized.

UV (λmax) 682 nm

Example 46

(31) obtained in the same manner as in Example 8 was acetylized with acetylchloride so as to obtain (106), and dye 32-(106) was synthesized.

UV (λmax) 705 nm

Example 47

(32)-C in Example 8 was reacted with diethylester malonic acid under a basic condition so as to obtain (27)-A.

(27)-A was processed in ethanol with methanesulfonic acid so as to obtain (27), and the dye 32-(27) was synthesized.

UV (λmax) 637 nm

Example 48

In the same way as in Example 8, dye 32-(46) was synthesized.

UV (λmax) 681 nm

Example 49

After (32)-D in Example 8 was reacted with chlorosulfonylisocyanate, the reaction product was treated with triethylamine to obtain (114), and thereafter, dye 32-(114) was synthesized.

UV (λmax) 648 nm

Example 50

(103)-A obtained in the same way as in Example 8 was reacted with amide N-2-ethyl-hexyl-cyanoacetate so as to obtain (103)-B, which was then made into (103)-C. (103)-C was treated with p-toluenesulfonylisocyanate to obtain (103), and thereafter, dye 32-(103) was synthesized.

UV (λmax) 667 nm

Example 51

(103-c) was acetylized in the same way as in Example 8 to obtain (113), and dye 32-(113) was synthesized.

UV (λmax) 730 nm

Example 52

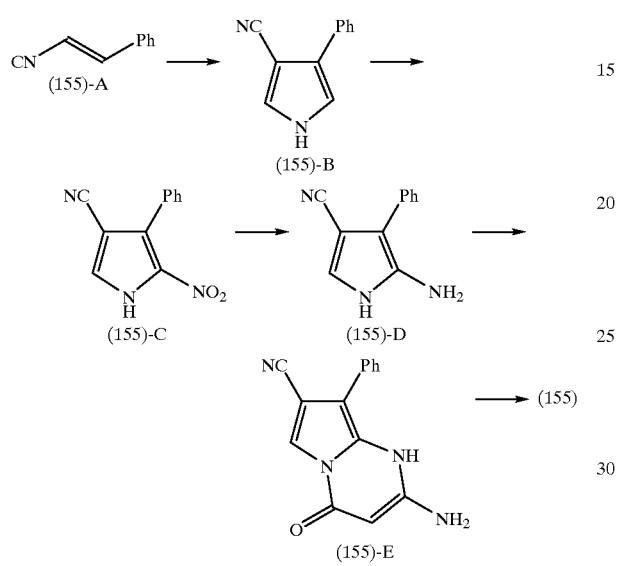

(155)-A was reacted with p-toluenesulfonylmethylisocyanide (TOSMIC) so as to obtain (155)-B, which was then nitrolyzed with acetic anhydride and concentrated nitric acid to obtain (155)-C. (155)-C was reduced with sodium hydrosulfite, so as to obtain (155)-D, and then (155)-E was obtained in the same way as in Example 8. (155)-E was treated with p-toluenesulfonylisocyanate to obtain (155), and dye 36-(155) was synthesized.

UV (λmax) 660 nm

Example 53

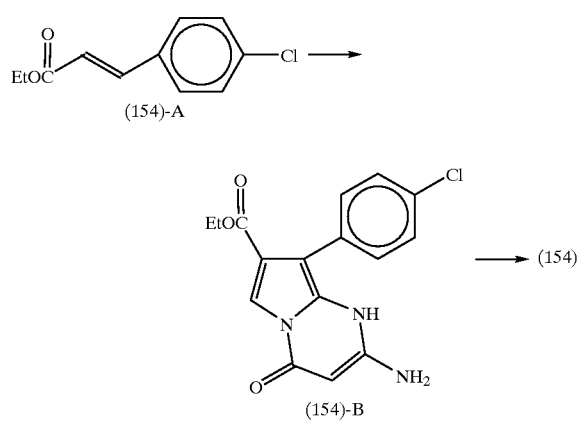

(154)-B was obtained from ethyl p-chlorocinnamate (154)-A in the same manner as in Example 52. (154)-B was treated with acetylchloride so as to obtain (154).

From (154), the dye 36-(154) was synthesized.

UV (λmax) 608.1 nm

Example 54

In the same way in Example 52 and in Example 10, the dye 36-(156) was obtained.

UV (λmax) 608 nm

Example 55

(32) in Example 8 was reacted with 2-ethylhexanoic acid chloride under a basic condition to obtain (35), and dye 32-(35) was synthesized.

UV (λmax) 698 nm

Example 56

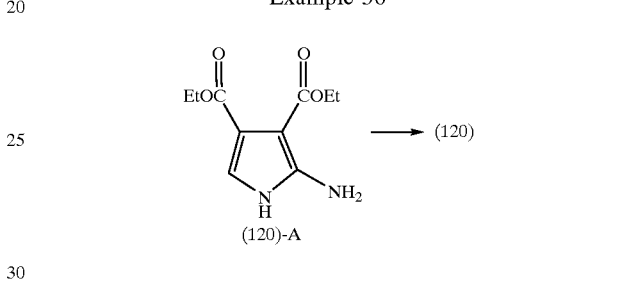

(120)-A was obtained in the same way as in Example 52, and (120) was obtained in the same way as in Example 1.

From (120), the dye 35-(120) was synthesized.

UV (λmax) 681 nm

Example 57

Dye 35-(121) was obtained in the same way as in Example 56.

UV (λmax) 659 nm

Example 58

Dye 35-(122) was obtained in the same way as in Example 56.

UV (λmax) 638 nm

Example 59

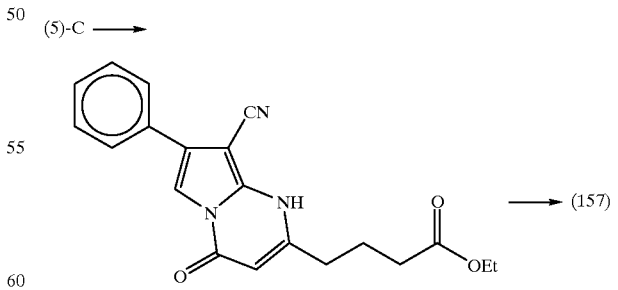

(5)-C in Example 1 was reacted with 3-oxopimelic acid ethylester to obtain (157)-A, which was hydrolyzed to obtain (157). From (157), the dye 1-(157) was synthesized.

UV (λmax) 649 nm

Example 60

(157) in Example 59 was processed with a methanol solution of sodium methoxide to synthesize (161), and the dye 20-(161) was obtained.

UV ($\lambda$max, $H_2O$) 640 nm

Example 61

Dye 108-(161) was obtained in the same manner as in Example 60.

UV ($\lambda$max, $H_2O$) 645 nm

Example 62

Dye 114-(161) was obtained in the same manner as in Example 60.

UV ($\lambda$max, $H_2O$) 646 nm

Example 63

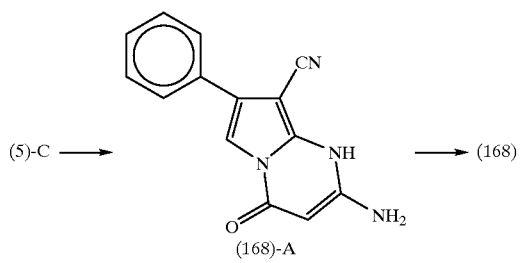

(5)-C in Example 1 was reacted in the same way as the reaction (3) in Example 8, so as to obtain (168)-A, which was reacted with succinic anhydride to obtain (168). The dye 108-(168) was synthesized.

UV ($\lambda$max, $H_2O$) 685 nm

Example 64

Dye 20-(168) was synthesized in the same manner as in Example 63.

UV ($\lambda$max, $H_2O$) 660 nm

Example 65

(168) in Example 63 was made into (172) in the same way as in Example 60, and dye 20-(172) was synthesized.

UV ($\lambda$max, $H_2O$) 661 nm

Example 66

Dye 108-(168) was synthesized in the same manner as in Example 63.

UV ($\lambda$max, $H_2O$) 653 nm

Example 67

The dye 31-(209) was synthesized in accordance with the following process.

Ar portion was synthesized in the same manner as in Example 2.

Coupler Portion was synthesized by treating the aminopyrrole obtained in the same manner as in Example 8 as follows.

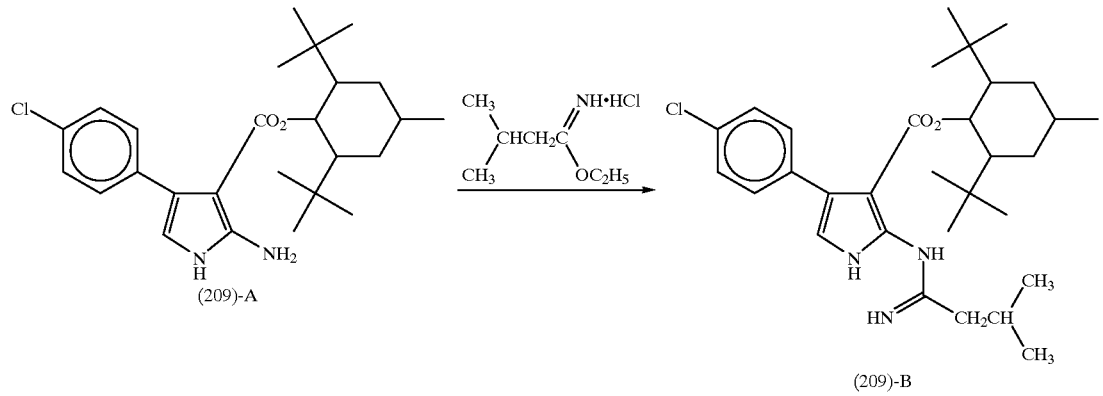

11 g of triethylamine was added to acetonitrile solution containing 44.5 g of the aminopyrrole and 17.3 g of iminoether on ice. Stirring was carried out for 2 hours at 25° C., and the precipitated crystals were filtered, washed with water, and dried so as to obtain 39.3 g of (209)-(B).

10.5 g of (209)-(B) and 4.02 g of chloroformate phenylester was stirred in acetonitrile solution for four hours at room temperature. The reaction solution was poured into water. The precipitated crystals were filtered, and recrystallized with ethylacetic isopropylalcohol so as to obtain 8.2 g of coupler (209).

Synthesize of Dye

The diazonium salt, which is shown by following formula 31 and which was synthesized in the same manner as in Example 2, was used in the azo coupling reaction.

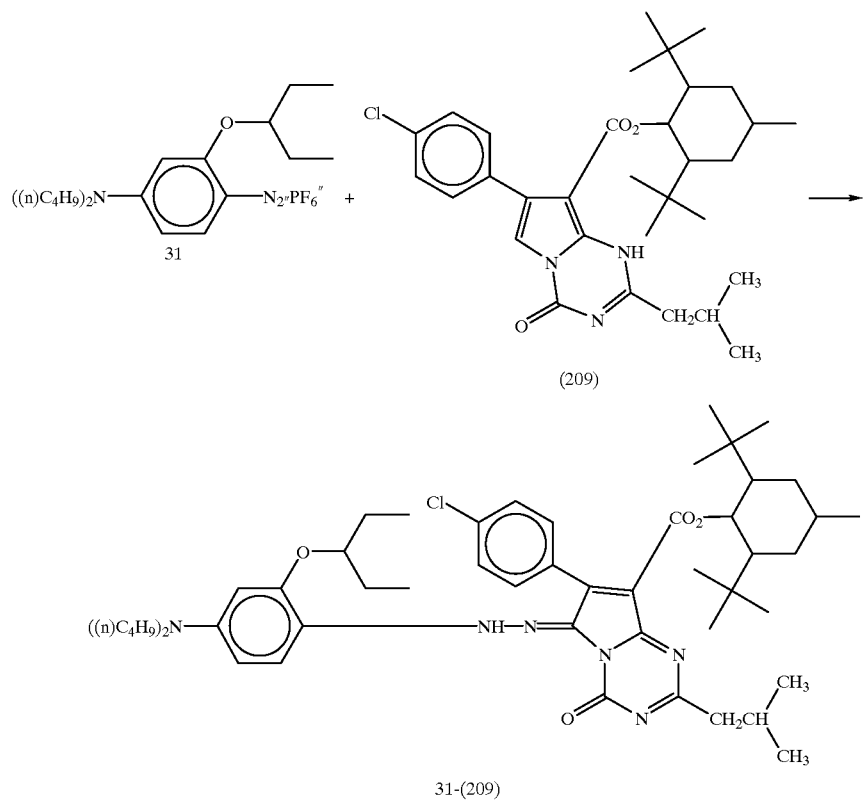

0.93 g of the compound 31 was added to 20 ml of methanol solution containing 0.25 g of triethylamine. Stirring was carried out for one hour at room temperature. The precipitated crystals were filtered and washed with warm water. The crystals were recrystallized with methanol so as to obtain 0.73 g of dye 31-(209).

$^1$-NMR (CDCl$_3$, δ value, TMS reference) 0.882 (18H, br-s) 0.94–1.03 (20H, m) 1.17 (2H, m) 1.25 (2H, m) 1.37 (4H, m) 1.52–1.58 (12H, m) 1.77 (2H, m) 1.86 (2H, m) 2.40 (1H, m) 2.66 (2H, d) 3.28 (4H, t) 4.13 (1H, qn) 5.89 (1H, s) 6.07 (1H, d) 6.18 (1H, dd) 7.03 (1H, d) 7.26–7.44 (4H, m) 15.81 (1H, s)

UV (λmax, ε) 697.5 nm (40300)

Example 68

Diazonium salt 36 was synthesized in the same manner as in Example 67 so as to obtain Dye 36-(209).

UV (λmax, ε) : 697.5 nm (40300)

Example 69

Diazonium salt 36 was synthesized in the same manner as in Example 67 so as to obtain Dye 36-(213).

UV (λmax): 691 nm

Example 70

Coupler (217) was synthesized in the same manner as disclosed in Japanese Patent Application (JP-A) 2000-146506. (Coupler (217) is same as the example compound (4–2) described in JP-A 2000-146506.)

Dye 31-(217) was synthesized from the diazonium salt 31 and the coupler (217) in the same manner as Example 67.

$^1$-NMR (CDCl$_3$, δ value, TMS reference) 0.87 (18H, br-s) 0.94–1.00 (1SH, m) 1.13 (4H, m) 1.32–1.47 (8H, m) 1.55–1.63 (3H, m) 1.75–2.17 (4H, m) 3.27 (4H, t) 4.08 (3H, s) 4.12 (1H, qn) 5.90 (1H, s) 6.07 (1H, d) 6.17 (1H, dd) 6.95 (1H, d) 7.35 (2H, d) 7.42 (2H, d) 15.4 (1H, s)

UV (λmax, ε; ethyl acetate): 642 nm (42500)

Example 71

55- Diazonium salt 201 was synthesized in the same manner so as to obtain Dye 201-(217).

$^1$-NMR (CDCl$_3$, δ value, TMS reference) 0.87 (18H, br-s) 0.98–1.60 (10H, m) 4.11 (3H, s) 5.91 (1H, s) 7.10 (3H, m) 7.33 (2H, t) 7.33–7.56 (4H, m) 14.6 (1H, s)

UV (λmax, ε; ethyl acetate) : 491 nm

Example 72

Dye 60-(217)

$^1$-NMR (CDCl$_3$, δ value, TMS reference) 0.87 (18H, s) 0.88–1.32 (29H, m) 1.50 (2H, m) 1.71 (2H, m) 3.04 (6H, s) 3.32 (2H, t) 4.11 (3H, s) 5.91 (1H, s) 6.85 (1H, dd) 7.11 (1H, d) 7.17 (1H, d) 7.39–7.50 (4H, m) 13.8 (1H, s)

UV (λmax, ε; ethyl acetate) : 566 nm

Example 73

Dye 1-(217)

UV (λmax, ε; ethyl acetate) : 597 nm

Example 74

Coupler Portion (235) was synthesized in the same manner as disclosed in Japanese Patent Application (JP-A) 11-132468.

Diazonium salt was synthesized in the same manner as in Example 67 so as to obtain Dye 32-(235).

UV (λmax, ε: 694 nm (44100)

Example 75–90

Following dyes were obtained in the same manner as Example 74.

| Example | Dye | UV(λ max, ε) | | Solvent |
|---|---|---|---|---|
| 75 | 36-(235) | 629 nm | 42600 | Chloroform-methanol |
| 76 | 32-(234) | 717 nm | 46800 | Chloroform-methanol |
| 77 | 36-(234) | 681 nm | 42000 | Chloroform-methanol |
| 78 | 36-(240) | 633 nm | — | Chloroform-methanol |
| 79 | 32-(240) | 701 nm | — | Chloroform-methanol |
| 80 | 32-(238) | 648 nm | 29400 | Chloroform-methanol |
| 81 | 36-(239) | 651 nm | 40800 | Chloroform-methanol |
| 82 | 32-(241) | 704 nm | 53000 | Chloroform-methanol |
| 83 | 36-(241) | 669 nm | 43100 | Chloroform-methanol |
| 84 | 285-(240) | 550 nm | 36000 | Chloroform-methanol |
| 85 | 285-(239) | 561 nm | 37800 | Chloroform-methanol |
| 86 | 305-(239) | 607 nm | 28400 | Chloroform-methanol |
| 87 | 60-(239) | 606 nm | 22000 | Chloroform-methanol |
| 88 | 94-(239) | 632 nm | 21000 | Chloroform-methanol |
| 89 | 32-(242) | 678 nm | — | Chloroform-methanol |
| 90 | 36-(237) | 661 nm | — | Chloroform-methanol |

Coupler Portion (237) was synthesized by obtaining an aminopyrrole synthesized in the same manner as Example 53 followed by the treatment disclosed in Japanese Patent Application (JP-A) 11-132468.

Example 91

Coupler Portion (225) was synthesized in the same manner as disclosed in Japanese Patent Application (JP-A) 11-132468. Compound 32 and Coupler Portion (226), which was obtained by reacting Coupler Portion (225) and acetyl chloride, were used in the azo coupling reaction so as to obtain Dye 32-(226).

UV (λmax) :713 nm

Example 92

Dye 36-(226).

UV (λmax): 676 nm

Example 93

Coupler portion (227) was synthesized in the same manner as in Example 91 so as to obtain Dye 32-(227).

UV (λmax): 715 nm

Example 94

Dye 36-(227).

UV (λmax): 680 nm

Example 95

Dye 32-(229).

UV (λmax): 704 nm

Example 96

Dye 36-(229).

UV (λmax): 664 nm

Example 97

2-mercapto triazine obtained in the same manner as disclosed in Japanese Patent Application (JP-A) 11-132468 and represented by the following formula:

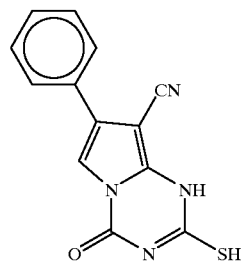

Coupler portion (274) was obtained by reacting the 2-mercapto triazine with potassium salt of chloroacetic acid. 1 and the coupler (274) were used in the azo coupling reaction so as to obtain Dye 1-(274).

UV (λmax, H₂O): 668 nm

From the above Examples it can be seen that the hydrazone dye expressed by general formula (I) results in excellent hues from magenta through cyan.

What is claimed is:

1. A hydrazone dye comprising a compound represented by a general formula (I) as follows:

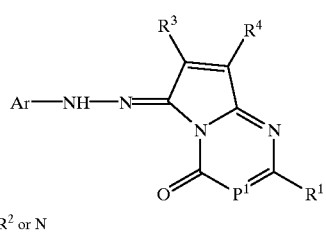

general formula (I)

$P^1$ is $CR^2$ or N wherein Ar represents an aryl group or a heterocyclic group; $R^1$ through $R^4$ each represent a hydrogen atom, a halogen, —CN, —NH$_2$, —NO$_2$, —OH, —CO$_2$H, —SO$_3$H, a quaternary ammonium group, —CO$_2$M$_{1/n}$, —SO$_3$M$_{1/n}$, an alkyl group, alkenyl group, alkynyl group, aryl group, acyl group, carbamoyl group, sulfamoyl group, alkoxycarbonyl group, aryloxycarbonyl group, acyloxy group, alkoxy group, aryloxy group, alkylthio group, arylthio group, alkylsulfonyl group, arylsulfonyl group, alkylphosphoryl group, arylphosphoryl group, or a substituted amino group; M represents a metal atom; and n represents an integer from 1 to 4.

2. The hydrazone dye according to claim 1, wherein the group represented by Ar is represented by a general formula (II) as follows:

general fomula (II)

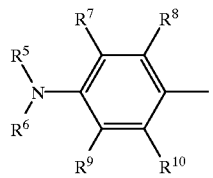

wherein $R^5$ and $R^6$ each represent a hydrogen atom, an alkyl group, or an aryl group; and $R^7$ through $R^{10}$ are each respectively defined identical to that for $R^1$ through $R^4$ of general formula (I).

3. The hydrazone dye according to claim 1, wherein the group represented by Ar is represented by a general formula (III) as follows:

general formula (III)

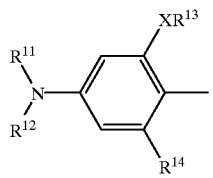

wherein $R^{11}$ through $R^{13}$ represent a hydrogen atom, an alkyl group or an aryl group; $R^{14}$ represents a hydrogen atom, a halogen, an alkyl group, an alkoxy group, an aryl group or an aryloxy group; and X represents O or S.

4. The hydrazone dye according to claim 1, wherein the group represented by Ar is represented by a general formula (IV) as follows:

general formula (IV)

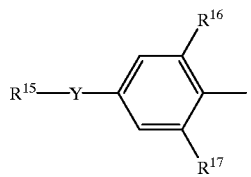

wherein $R^{15}$ is a hydrogen atom, an alkyl group or an aryl group; $R^{16}$ and $R^{17}$ represent a hydrogen atom, a halogen, an alkyl group, an alkoxy group, an aryloxy group, an alkylthio group, an arylthio group or an aryl group; and Y represents O or S.

5. A hydrazone dye comprising a compound represented by a general formula (V) as follows:

general formula (V)

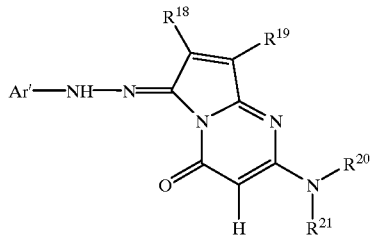

wherein Ar' represents an aryl group or a heterocyclic group; $R^{18}$ and $R^{19}$ each represent a hydrogen atom, a halogen, —CN, —NH$_2$, —NO$_2$, —OH, —CO$_2$H, —SO$_3$H, a quarternary ammonium group, —CO$_3$M$_{1/n}$, —SO$_3$M$_{1/n}$, an alkyl group, alkenyl group, alkynyl group, aryl group, acyl group, carbamoyl group, sulfamoyl group, alkoxycarbonyl group, aryloxycarbonyl group, acyloxy group, alkoxy group, aryloxy group, alkylthio group, arylthio group, alkylsulfonyl group, arylsulfonyl group, alkylphosphoryl group, arylphosphoryl group, or a substituted amino group; M represents a metal atom; and n represents an integer from 1 to 4; $R^{20}$ represents an acyl group, a carbamoyl group, a sulfamoyl group, an alkoxycarbonyl group, an alkylsulfonyl group, or an arylsulfonyl group; and $R^{21}$ represents a hydrogen atom, an alkyl group, an aryl group or an acyl group.

6. The hydrazone dye according to claim 5, wherein the group represented by Ar' is represented by a general formula (VII) as follows:

general formula (VII)

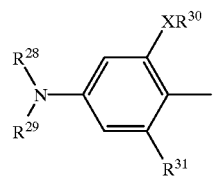

wherein $R^{28}$ through $R^{30}$ represent a hydrogen atom, an alkyl group or an aryl group; $R^{31}$ represents a hydrogen atom, a halogen, an alkyl group, an alkoxy group, an aryl group or an aryloxy group; and X represents O or S.

7. The hydrazone dye according to claim 5, wherein the group represented by Ar' is represented by a general formula (VIII) as follows:

general formula (VIII)

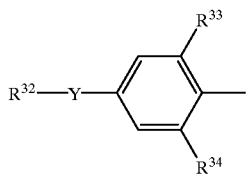

wherein $R^{32}$ is a hydrogen atom, an alkyl group or an aryl group; $R^{33}$ and $R^{34}$ represent a hydrogen atom, a halogen, an alkyl group, an alkoxy group, an aryloxy group, an alkylthio group, an arylthio group or an aryl group; and Y represents O or S.

8. A hydrazone dye comprising a compound represented by a general formula (IX) as follows:

general formula (IX)

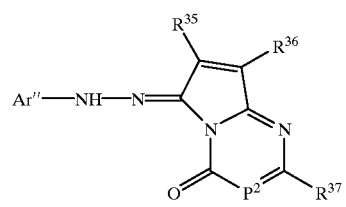

$P^2$ is $CR^{38}$ or N wherein Ar" represents an aryl group or a heterocyclic group; $R^{35}$, $R^{36}$ and $R^{37}$ each represents a hydrogen atom, a halogen, —CN, —NH$_2$, —NO$_2$, —OH, —CO$_2$H, —SO$_3$H, a quarternary ammonium group, —CO$_2$M$_{1/n}$, —SO$_3$M$_{1/n}$, an alkyl group, alkenyl group, alkynyl group, aryl group, acyl group, carbamoyl group, sulfamoyl group, alkoxycarbonyl group, aryloxycarbonyl group, acyloxy group, alkoxy group, aryloxy group, alkylthio group, arythio group, alkylsulfonyl group, arylsulfonyl group, alkylphosphoryl group, arylphosphoryl group, or a substituted amino group; M represents a metal atom; and n represents an integer from 1 to 4; and $R^{38}$ represents an electron attracting group whose Hammett $\sigma_p$ value is 0.25 or more.

9. The hydrazone dye according to claim 8, wherein the group represented by Ar" is represented by a general formula (XI) as follows:

general formula (XI)

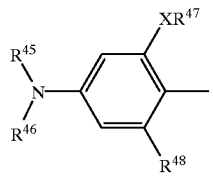

wherein $R^{45}$ through $R^{47}$ represent a hydrogen atom, an alkyl group or an aryl group; $R^{48}$ represents a hydrogen atom, a halogen, an alkyl group, an alkoxy group, an aryl group or an aryloxy group; and X represents O or S.

10. The hydrazone dye according to claim 8 wherein the group represented by Ar" is represented by a general formula (XII) as follows:

general formula (XII)

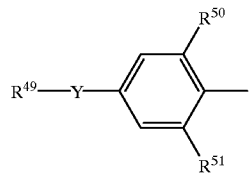

wherein $R^{49}$ is a hydrogen atom, an alkyl group or an aryl group; $R^{50}$ and $R^{51}$ represent a hydrogen atom, a halogen, an alkyl group, an alkoxy group, an aryloxy group, an alkylthio group, an arylthio group or an aryl group; and Y represents O or S.

11. The hydrazone dye according to claim 2, wherein $P^1$ represents C—H and $R^1$ represents a substituted amino group.

12. The hydrazone dye according to claim 2, wherein $P^1$ represents $CR^{38}$ or N, wherein $R^{38}$ represents an electron attracting group whose Hammett $\sigma_p$ value is 0.25 or more.

* * * * *